US012406136B2

(12) United States Patent
Raghunathan et al.

(10) Patent No.: US 12,406,136 B2
(45) Date of Patent: Sep. 2, 2025

(54) METHOD AND SYSTEM FOR DETERMINING RELATIONSHIPS BETWEEN LINGUISTIC ENTITIES

(71) Applicant: nference, inc., Cambridge, MA (US)

(72) Inventors: Bharathwaj Raghunathan, Mississauga (CA); Vishal Jain, Toronto (CA); Tyler Wagner, Boston, MA (US); Tyler Feener, Toronto (CA); Shimeng Chen, Toronto (CA); Eric Brine, Toronto (CA); Lorenzo Kogler Anele, Toronto (CA); Danylo Oliynyk, Toronto (CA); Rashik Shahjahan, Toronto (CA)

(73) Assignee: nference, Inc., Cambridge, MA (US)

( * ) Notice: Subject to any disclaimer, the term of this patent is extended or adjusted under 35 U.S.C. 154(b) by 204 days.

(21) Appl. No.: 18/052,697

(22) Filed: Nov. 4, 2022

(65) Prior Publication Data
US 2023/0143418 A1  May 11, 2023

Related U.S. Application Data

(60) Provisional application No. 63/276,342, filed on Nov. 5, 2021.

(51) Int. Cl.
*G06F 40/205* (2020.01)
*G06F 40/289* (2020.01)
*G06F 40/30* (2020.01)

(52) U.S. Cl.
CPC .......... *G06F 40/205* (2020.01); *G06F 40/289* (2020.01); *G06F 40/30* (2020.01)

(58) Field of Classification Search
CPC .................................................. G06F 40/30
See application file for complete search history.

(56) References Cited

U.S. PATENT DOCUMENTS 7,003,442 B1   2/2006   Tsuda
7,464,043 B1   12/2008  Dussia
(Continued)

FOREIGN PATENT DOCUMENTS

CN     101976170        2/2016
JP     2019-536178 A    12/2019
(Continued)

OTHER PUBLICATIONS

Yu, Juntao, Bernd Bohnet, and Massimo Poesio. "Named entity recognition as dependency parsing." arXiv preprint arXiv: 2005.07150 (2020). (Year: 2020).*

(Continued)

*Primary Examiner* — Jialong He
(74) *Attorney, Agent, or Firm* — Caldwell Intellectual Property Law

(57) ABSTRACT

Disclosed herein are methods for identifying and classifying relationships between entities. A method of identifying relationships includes receiving a first entity and a second entity; accessing a corpus; retrieving a plurality of sentences containing the first entity and the second entity from the corpus; identifying a plurality of relational phrases by extracting a relational phrase from each of the plurality of sentences; and identifying one or more relationships between the first entity and the second entity. A method of classifying relationships includes using a classification model.

49 Claims, 12 Drawing Sheets

(56) References Cited

U.S. PATENT DOCUMENTS

| | | | |
|---|---|---|---|
| 8,601,361 B2 | 12/2013 | Berger et al. | |
| 8,943,126 B1 | 1/2015 | Feldman | |
| 9,088,532 B1 | 7/2015 | Dorsey et al. | |
| 9,183,203 B1 | 11/2015 | Tuchman et al. | |
| 9,514,405 B2 | 12/2016 | Chen et al. | |
| 9,734,181 B2 | 8/2017 | Wang et al. | |
| 10,360,507 B2 | 7/2019 | Aravamudan et al. | |
| 2002/0052901 A1 | 5/2002 | Guo et al. | |
| 2004/0013302 A1 | 1/2004 | Ma et al. | |
| 2004/0220925 A1 | 11/2004 | Liu et al. | |
| 2006/0122976 A1 | 6/2006 | Baluja et al. | |
| 2007/0073690 A1 | 3/2007 | Boal et al. | |
| 2007/0118506 A1 | 5/2007 | Kao et al. | |
| 2008/0243825 A1 | 10/2008 | Staddon et al. | |
| 2009/0116736 A1 | 5/2009 | Neogi et al. | |
| 2011/0137921 A1 | 6/2011 | Inagaki | |
| 2011/0255788 A1 | 10/2011 | Duggan et al. | |
| 2012/0079372 A1* | 3/2012 | Kandekar | G06F 3/0482 |
| | | | 715/256 |
| 2012/0204104 A1 | 8/2012 | Walsh | |
| 2012/0254188 A1 | 10/2012 | Koperski et al. | |
| 2012/0323590 A1 | 12/2012 | Udani | |
| 2013/0132331 A1 | 5/2013 | Kowalczyk et al. | |
| 2014/0080428 A1 | 3/2014 | Rhoads et al. | |
| 2015/0112664 A1 | 4/2015 | Srinivasan | |
| 2015/0254555 A1 | 9/2015 | Williams, Jr. et al. | |
| 2015/0310115 A1 | 10/2015 | Ryger et al. | |
| 2016/0378808 A1 | 12/2016 | Hopcroft et al. | |
| 2018/0268023 A1 | 9/2018 | Korpusik | |
| 2018/0336183 A1* | 11/2018 | Lee | G06N 5/022 |
| 2019/0005049 A1 | 1/2019 | Mittal | |
| 2019/0130024 A1 | 5/2019 | Burchfield et al. | |
| 2019/0354544 A1* | 11/2019 | Hertz | G06N 5/025 |
| 2019/0354883 A1 | 11/2019 | Aravamudan et al. | |
| 2019/0370337 A1* | 12/2019 | Lee | G06N 3/04 |
| 2020/0184278 A1 | 6/2020 | Zadeh et al. | |
| 2020/0380202 A1 | 12/2020 | Cass et al. | |
| 2021/0019287 A1 | 1/2021 | Prasad et al. | |
| 2021/0073225 A1 | 3/2021 | Nelson et al. | |
| 2021/0117509 A1* | 4/2021 | Aditya | G06F 40/30 |
| 2021/0191925 A1 | 6/2021 | Sianez | |
| 2021/0218570 A1 | 7/2021 | Manasse et al. | |
| 2021/0224264 A1* | 7/2021 | Barve | G06F 16/2458 |
| 2022/0019907 A1* | 1/2022 | Georgopoulos | G06F 40/10 |

FOREIGN PATENT DOCUMENTS

| | | |
|---|---|---|
| WO | WO-2018057945 | 3/2018 |
| WO | WO-2021011776 | 1/2021 |
| WO | WO-2021146694 A1 | 7/2021 |

OTHER PUBLICATIONS

Zhang, Yue, et al. "Entity relation extraction as dependency parsing in visually rich documents." arXiv preprint arXiv:2110.09915 (Oct. 19, 2021). (Year: 2021).*

Zhang, Yunquan, et al. "Parallel processing systems for big data: a survey." Proceedings of the IEEE 104.11 (2016): 2114-2136. (Year: 2016).*

AMD Secure Encrypted Virtualization (SEV), https://developer.amd.com/sev/, accessed Sep. 23, 2020 (5 pages).

Arora, S. et al., "A Simple But Tough-To-Beat Baseline for Sentence Embeddings", ICLR, 2017 (16 pages).

AWS Key Management Service (KMS), https://aws.amazon.com/kms, accessed Sep. 23, 2020 (6 pages).

Bartunov, S. et al., "Breaking Sticks And Ambiguities With Adaptive Skip-Gram", retrieved online from URL:< https://arxiv.org/pdf/1502.07257.pdf>, [cs.CL], Nov. 15, 2015 (15 pages).

Bojanowski, P. et al., "Enriching Word Vectors with Subword Information", retrieved online from URL:<https://arxiv.org/pdf/1607.04606.pdf>, [cs.CL], Jun. 19, 2017 (12 pages).

Confidental Computing Consortium, "What is the Confidential Computing Consortium?", https://confidentialcomputing.io, accessed Sep. 24, 2020 (2 pages).

de Guzman, C.G. et al., "Hematopoietic Stem Cell Expansion and Distinct Myeloid Developmental Abnormalities in a Murine Model of the *AML1-ETO* Translocation", Molecular and Cellular Biology, 22(15):5506-5517, Aug. 2002 (12 pages).

Desagulier, G., "A lesson from associative learning: asymmetry and productivity in multiple-slot constructions", Corpus Linguisitic and Linguistic Theory, 12(2):173-219, 2016, submitted Aug. 13, 2015, <http://www.degruyter.com/view/j/cllt.2016.12.issue-2/cllt-2015-0012/cllt-2015-0012.xml?format=INT>. <10.1515/cllt-2015-0012>. <halshs-01184230>, (32 pages).

Devlin, J. et al., "BERT: Pre-training of Deep Bidirectional Transformers for Language Understanding", <https://arXiv:1810.04805v2> [cs.CL], May 24, 2019 (16 pages).

Divatia, A., "The Fact and Fiction of Homomorphic Encryption", Dark Reading, www.darkreading.com/attacks-breaches/the-fact-and-fiction-of-homomorphic-encryption/a/d-id/1333691, Jan. 22, 2019 (2 pages).

Dwork, C., "Differential Privacy: A Survey of Results", Lecture Notes in Computer Science, vol. 4978, pp. 1-19, 2008 (19 pages).

Genkin, D. et al., "Privacy in Decentralized Cryptocurrencies", Communications of the ACM, 61(6):78-88, Jun. 2018 (11 pages).

Hageman, G.S et al., "A common haplotype in the complement regulatory gene factor H (*HF1/ CFH*) predisposes individuals to age-related macular degeneration", PNAS, 102(20):7227-7232, May 17, 2005 (6 pages).

Ikeda, T. et al., "Anticorresponding mutations of the *KRAS* and *PTEN* genes in human endometrial cancer", Oncology Reports, 7: 567-570, published online May 1, 2000 (4 pages).

Intel, "What is Intel® SGX?", https://www.intel.com/content/www/us/en/architecture-and-technology/software-guard-extensions.html, accessed Sep. 23, 2020 (8 pages).

International Preliminary Report on Patentabilty issued in International Application PCT/US21/13897, dated Jul. 19, 2022 (7 pages).

International Preliminary Report on Patentability issued in International Application No. PCT/US20/42336, dated Jan. 18, 2022 (9 pages).

International Search Report and Written Opinion issued by the European Patent Office as International Searching Authority in International Application PCT/US2017/053039, dated Dec. 20, 2017 (15 pages).

International Search Report and Written Opinion issued by the U.S. Patent and Trademark Office as International Searching Authority in International Application No. PCT/US22/79269 dated Feb. 3, 2023 (9 pages).

International Search Report and Written Opinion issued by U.S. Patent and Trademark Office as International Searching Authority in International Application No. PCT/US20/42336, dated Sep. 30, 2020 (10 pages).

International Search Report and Written Opinion, issued by U.S. Patent and Trademark Office as International Searching Authority, in International Application No. PCT/US21/13897, dated Apr. 5, 2021 (8 pages).

Joulin, A. et al., "Bag of Tricks for Efficient Text Classification", retrieved online from URL:<https://arXiv.org/pdf/1607.01759v3.pdf>, [cs.CL], Aug. 9, 2016 (5 pages).

Kiros, R. et al., "Skip-Thought Vectors", retrieved online from URL:<https://arXiv.org/abs/1506.06726v1>, [cs.CL], Jun. 22, 2015 (11 pages).

Kolte, P. "Why Is Homomorphic Encryption Not Ready For Primetime?", Baffle, https://baffle.io/blog/why-is-homomorphic-encryption-not-ready-for-primetime/, Mar. 17, 2017 (4 pages).

Korger, C., "Clustering of Distributed Word Representations and its Applicability for Enterprise Search", Doctoral Thesis, Dresden University of Technology, Faculty of Computer Science, Institute of Software and Multimedia Technology, Matriculation Nr. 3703541, submitted Jul. 28, 2016 (116 pages).

Kutuzov, A. et al., "Cross-lingual Trends Detection for Named Entities in News Texts with Dynamic Neural Embedding Models", Proceedings of the NewsIR'16 Workshop at ECIR, Padua, Italy, Mar. 20, 2016 (6 pages).

(56) References Cited

OTHER PUBLICATIONS

Le, Q. et al., "Distributed Representations of Sentences and Documents", Proceedings of the 31st International Conference of Machine Learning, Beijing, China, vol. 32, 2014 (9 pages).
Li, H. et al., "Cheaper and Better: Selecting Good Workers for Crowdsourcing," retrieved online from URL: https://arXiv.org/abs/1502.00725v1, Feb. 3, 2015 (16 pages).
Ling, W. et al., "Two/Too Simple Adaptations of Word2Vec for Syntax Problems", retrieved online from URL:<https://cs.cmu.edu/~lingwang/papers/naacl2015.pdf>, 2015 (6 pages).
Maxwell, K.N. et al., "Adenoviral-mediated expression of Pcsk9 in mice results in a low-density lipoprotein receptor knockout phenotype", PNAS, 101(18):7100-7105, May 4, 2004 (6 pages).
Mikolov, T. et al., "Distributed Representations for Words and Phrases and their Compositionality", retrieved online from URL:https://arXiv.org/abs/1310.4546v1 [cs.CL], Oct. 16, 2013 (9 pages).
Mikolov, T. et al., "Efficient Estimation of Word Representations in Vector Space", retrieved online from URL: https://arXiv.org/abs/1301.3781v3 [cs.CL] Sep. 7, 2013 (12 pages).
Murray, K., "A Semantic Scan Statistic for Novel Disease Outbreak Detection", Master's Thesis, Carnegie Mellon University, Aug. 16, 2013 (68 pages).
Neelakantan, A., et al., "Efficient Non-parametric Estimation of Multiple Embeddings per Word in Vector Space," Department of Computer Science, University of Massachusetts, (2015) (11 pages).
Pennington, J. et al., "GloVe: Global Vectors for Word Representation", retrieved online from URL:<https://nlp.stanford.edu/projects/glove.pdf>, 2014 (12 pages).
Rajagopalan, H., et al., "Tumorigenesis: RAF/RAS oncogenes and mismatch-repair status", Nature, 418:934, Aug. 29, 2002 (1 page).
Shamir, A. "How to Share a Secret", Communications of the ACM, 22(11):612-613, Nov. 1979 (2 pages).
Shweta, Fnu et al., "Augmented Curation of Unstructured Clinical Notes from a Massive EHR System Reveals Specific Phenotypic Signature of Impending COVID-19 Diagnosis", https://www.medrxiv.org/content/10.1101/2020.04.19.20067660v3.full, accessed Sep. 24, 2020 (24 pages).
Wieting, J. et al., "Revisiting Recurrent Networks for Paraphrastic Sentence Embeddings", retrieved online from URL:<https://arXiv.org/pdf/1705.00364v1.pdf>, [cs.CL], Apr. 30, 2017 (12 pages).
Yao, Z. et al., "Dynamic Word Embeddings for Evolving Semantic Discovery", WSDM 2018, Marina Del Rey, CA, USA, Feb. 5-9, 2018 (9 pages).
Zuccon, G., et al., "Integrating and Evaluating Neural Word Embeddings in Information Retrieval", ADCS, Parramatta, NSW, Australia, Dec. 8-9, 2015 (8 pages).

\* cited by examiner

Cluster Information
10 Results

| Top Relation | | Cluster Size | Percentage (%) |
|---|---|---|---|
| occurred | | | |
| Enriched Terms (i) (interstitial lung disease) (immune-Mediated Pneumonitis) (sRGB) (Checkmate) (bpc) | | 220 | 51.4 |
| is associated | | | |
| (colitis) (hepatitis) (nephritis) (adverse reactions) (endocrinopathies) | | 54 | 12.62 |
| were reported | | | |
| (treatment-related pneumonitis) (non-small-cell lung cancer) (interstitial lung disease) (grade 4) (none) | | 33 | 7.71 |
| was observed | | | |
| (platinum-based chemotherapy) (treatment discontinuation) (treatment-related deaths) (CTCAE) (CHECKMATE) | | 32 | 7.48 |
| was discontinued | | | |
| (steroids) (adrenal crisis) (hepatitis) (Tumor cavitation) (in 1) | | 25 | 5.84 |
| commonly occurs | | | |
| (re-initiation) (taper) (corticosteroid) (ipilimumab) (cohort) | | 25 | 5.84 |
| developed | | | |
| (ipilimumab-nivolumab) (programmed death-1) (rechallenge) (toxicity) (episode) | | 21 | 4.91 |

FIG. 5B

Top Relation        Cluster Size        Percentage (%)

occurred

Enriched Terms ⓘ : interstitial lung disease        220        51.4

( Immune-Mediated Pneumonitis ) ( sRGB ) ( Checkmate ) ( bpc )

Top Relations
occurred

Sentences

Notably, a pneumonitis flare *occurred* without restarting nivolumab, which may be a unique feature of immune-related pneumonitis.

\n' '\n' 'OPDIVO (nivolumab) IMPORTANT SAFETY INFORMATION \n' 'Immune-Mediated Pneumonitis \n' '\uf0b7 \nSevere Pneumonitis or interstitial lung disease, including fatal cases, *occurred* with OPDIVO \ntreatment.

\n' '<image: ICCBased (RGB, sRGB IEC61966-2.1), width 362, height 49, bpc 8>', '\n', '\nIMPORTANT SAFETY INFORMATION \n' 'Immune-Mediated Pneumonitis \n' '\uf0b7 \nSevere Pneumonitis or interstitial lung disease, including fatal cases, *occurred* with OPDIVO \ntreatment.

In \n' 'Checkmate 025, pneumonitis, including interstitial lung disease, *occurred* in 5% (21/406) of patients \n' 'receiving *OPDIVO* and 18% (73/397) of patients receiving everolimus.

FIG. 5D

| Training Statistics | | | | | | |
|---|---|---|---|---|---|---|
| Label | Precision | Recall | F-score | Pairs with relations | Relations per class | Support |
| Adverse Event | 0.87 | 0.96 | 0.91 | 238 | 17,671 | 48 |
| Indication | 0.97 | 0.90 | 0.93 | 335 | 46,322 | 68 |

FIG. 6A

**Cluster sentences for *is used to treat***

- Micromedex US Brand Name Glucovance Descriptions *Glyburide* and metformin combination is used to treat *high blood sugar* levels caused by a type of diabetes mellitus (sugar diabetes) called type 2 diabetes. ☑
- *Methylphenidate* is used to treat ADHD and *narcolepsy*☑
- Side Effects - Drugs.com Drugs.com *Methylphenidate* is used to treat *attention deficit disorder (ADD)* and attention deficit hyperactivity disorder (ADHD). ... ☑
- *Etoposide* is used to treat Hodgkin's and non-Hodgkin's *lymphomas*, lung, gastric, breast, and testicular cancers (Montecucco et al., 2015, Hande, 1998). ☑
- Why this medication is prescribed *Adefovir* is used to treat chronic (long-term) *hepatitis B infection* (swelling of the liver caused by a virus) in patients who have symptoms of the disease. ☑

FIG. 6C

METHOD AND SYSTEM FOR DETERMINING RELATIONSHIPS BETWEEN LINGUISTIC ENTITIES

RELATED APPLICATIONS

This application claims priority to U.S. Provisional Application No. 63/276,342, filed Nov. 5, 2021, which is incorporated by reference herein in its entirety.

FIELD OF THE INVENTION

The present disclosure relates to systems, methods, and computer readable media for analyzing underlying relationships in data. In particular, the present disclosure relates to systems, methods, and computer readable media for analyzing underlying relationships within and across sentences.

BACKGROUND

Determining relationships between phrases within or across sentences remains a challenging problem even with natural language processing driven by deep learning models. This is in part due to the approaches used to solve this problem. For instance, treating relationship harvesting as a classification problem given a sentence with the desired phrase pairs, requires large amounts of labeled data. The approach of determining relationships between sentences using a dependency graph suffers from the problem of having to use rules to harvest the relationship fragments which in general tend to be brittle given the symbolic processing methods used to find if to relating fragments are equivalent (a necessary step to find it relationships linking two phrases are the same).

BRIEF SUMMARY OF THE EMBODIMENTS

In one aspect a method includes receiving a first entity and a second entity; accessing a corpus; retrieving a plurality of sentences containing the first entity and the second entity from the corpus; identifying a first plurality of relational phrases by extracting a relational phrase from each of the first plurality of sentences; and identifying one or more relationships between the first entity and the second entity.

In some embodiments, extracting the relational phrase from each of the first plurality of sentences includes using a dependency parser to identify the relational phrase.

In some embodiments, extracting the relational phrase from each of the first plurality of sentences includes using a constituency parser to identify the relational phrase.

In some embodiments, the method further includes mapping each relational phrase in a pretrained vector space using a pretrained model; and clustering the plurality of relational phrases in the pretrained vector space.

In some embodiments, the pretrained model is trained using a supervised model.

In some embodiments, the pretrained model is trained using a self-supervised model.

In some embodiments, clustering the plurality of relational phrases in the pretrained vector space includes setting a threshold cosine distance; calculating a cosine distance between each of pair of the plurality of relational phrases in the pretrained vector space; clustering the plurality of relational phrases such that each pair of relational phrases whose cosine distance is within the threshold cosine distance share a cluster.

In some embodiments, identifying one or more relationships between the first entity and the second entity is based on clustering the plurality of relational phrases in the pretrained vector space.

In some embodiments, the method further includes providing a robustness score for each of the one or more relationships based on clustering of the plurality of relational phrases.

In some embodiments, the robustness score is based on a cosine distance between the relational phrases in the pretrained vector space.

In some embodiments, the method further includes ranking the one or more relationships based on clustering of the plurality of relational phrases.

In some embodiments, the method further includes classifying the one or more relationships using a classification model.

In some embodiments, the method further includes training the classification model on the corpus using example labels, wherein each example label includes an entity pair and a class.

In some embodiments, the example labels are generated by a human.

In some embodiments, the example labels are generated by a supervised model.

In some embodiments, training the classification model includes receiving the example labels; and for each example label: retrieving a plurality of training sentences containing the entity pairs from the corpus; identifying a plurality of classification relational phrases by extracting a relational phrase from each of the plurality of training sentences; and labeling the plurality of classification relational phrases with the class corresponding to the entity pair; mapping the plurality of labeled classification relational phrases for each example label in the pretrained vector space using the pretrained model; clustering the plurality of labeled classification relational phrases in the pretrained vector space.

In some embodiments, the classification model includes a plurality of classification relational phrases identified during training.

In some embodiments, the method further includes mapping the plurality of relational phrases in the pretrained vector space; clustering the relational phrases and the plurality of classification relational phrases in the pretrained vector space; and assigning a label to each relational phrase based on the clustering of the plurality of relational phrases and the plurality of classification relational phrases in the pretrained vector space; and assigning a classification to each of the one or more relationships between the first entity and the second entity.

In some embodiments, assigning the label to each relational phrase includes calculating a cosine distance between each relational phrase and each classification relational phrase in the pretrained vector space; identifying a plurality of closest classification relational phrases for each relational phrase; and assigning each relational phrase a label corresponding to that of the closest classification relational phrases.

In some embodiments, the method further includes assigning a confidence score to the classification.

In some embodiments, calculating the confidence score includes calculating a cosine distance between each relational phrase and each classification relational phrase in the pretrained vector space; identifying a plurality of closest classification relational phrases for each relational phrase;

and calculating an average cosine distance between each relational phrase and the closest classification relational phrases.

In some embodiments, the corpus includes a preprocessed corpus including a mapping of a plurality of pre-extracted entities, a plurality of pre-extracted relational phrase embeddings, and clustering information for the plurality of pre-extracted relational phrase embeddings.

In some embodiments, the method further includes pre-processing the corpus by retrieving a second plurality of sentences from the corpus; extracting a plurality of entities from each of the second plurality of sentences; extracting a relational phrase for each pair of extracted entities; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the method further includes pre-processing the corpus by grouping the corpus into a plurality of chunks at a head node; sending each of the plurality of chunks to one of a plurality of worker nodes of a distributed cluster; retrieving a second plurality of sentences from one of the plurality of chunks of the corpus by one of the plurality of worker nodes; extracting a plurality of entities from each of the second plurality of sentences by one of the plurality of worker nodes; extracting a relational phrase for each pair of extracted entities by one of the plurality of worker nodes; sending the plurality of extracted entities and the extracted relational phrases to the head node; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the method further includes accessing a preprocessed corpus, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities; and identifying the first plurality of relational phrases by using the pre-extracted relational phrase embeddings and the clustering information for the plurality of pre-extracted relational phrase embeddings for each of the first plurality of sentences.

In some embodiments, the method further includes sending the first entity and the second entity to each of a plurality of worker nodes; accessing a portion of a preprocessed corpus by one of the plurality of worker nodes, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities by one of the plurality of worker nodes; identifying the plurality of relational phrases by using the pre-extracted relational phrase embeddings and the clustering information for the plurality of pre-extracted relational phrase embeddings for each of the first plurality of sentences by one of the plurality of worker nodes; sending the first plurality of sentences and the pre-extracted relational phrase embeddings and clustering information for the pre-extracted relational phrase embeddings for each of the first plurality of sentences to the head node by one of the plurality of worker nodes; wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

In some embodiments, the method further includes classifying the one or more relationships using a classification model.

In one aspect, a system includes: a non-transitory memory; and one or more hardware processors configured to read instructions from the non-transitory memory that, when executed cause one or more of the hardware processors to perform operations including: receiving a first entity and a second entity; accessing a corpus; retrieving a first plurality of sentences containing the first entity and the second entity from the corpus; identifying a plurality of relational phrases by extracting a relational phrase from each of the first plurality of sentences; and identifying one or more relationships between the first entity and the second entity.

In some embodiments, extracting the relational phrase from each of the first plurality of sentences includes using a dependency parser or a constituency parser to identify the relational phrase.

In some embodiments, the operations further include mapping each relational phrase in a pretrained vector space using a pretrained model; and clustering the plurality of relational phrases in the pretrained vector space.

In some embodiments, the operations further include ranking the one or more relationships based on clustering of the plurality of relational phrases.

In some embodiments, the operations further include classifying the one or more relationships using a classification model; and training the classification model on the corpus using example labels, wherein each example label includes an entity pair and a class, wherein training the classification model includes receiving example labels; and for each example label: retrieving a plurality of training sentences containing the entity pairs from the corpus; identifying a plurality of classification relational phrases by extracting a relational phrase from each of the plurality of training sentences; and labeling the plurality of classification relational phrases with the class corresponding to the entity pair; mapping the plurality of labeled classification relational phrases for each example label in the pretrained vector space using the pretrained model; clustering the plurality of labeled classification relational phrases in the pretrained vector space.

In some embodiments, the operations further include mapping the plurality of relational phrases in the pretrained vector space; clustering the relational phrases and a plurality of classification relational phrases identified in training in the pretrained vector space; and assigning a label to each relational phrase based on the clustering of the plurality of relational phrases and the plurality of classification relational phrases in the pretrained vector space; and assigning a classification to each of the one or more relationships between the first entity and the second entity.

In some embodiments, the operations further include assigning a confidence score to the classification.

In some embodiments, the operations further include preprocessing the corpus by retrieving a second plurality of sentences from the corpus; extracting a plurality of entities from each of the second plurality of sentences; extracting a relational phrase for each pair of extracted entities; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the operations further include preprocessing the corpus by grouping the corpus into a plurality of chunks at a head node; sending each of the plurality of chunks to one of a plurality of worker nodes of a distributed cluster; retrieving a second plurality of sentences from one of the plurality of chunks of the corpus by one of the plurality of worker nodes; extracting a plurality of entities from each of the second plurality of sentences by one of the plurality of worker nodes; extracting relational phrase for each pair of extracted entities by one of the plurality of worker nodes; sending the plurality of extracted entities and the extracted relational phrases to the head node; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the operations further include accessing a preprocessed corpus, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities; and identifying the first plurality of relational phrases by using the pre-extracted relational phrase embeddings and the clustering information for the plurality of pre-extracted relational phrase embeddings for each of the first plurality of sentences.

In some embodiments, the operations further include sending the first entity and the second entity to each of a plurality of worker nodes; accessing a portion of a preprocessed corpus by one of the plurality of worker nodes, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities by one of the plurality of worker nodes; identifying the plurality of relational phrases by using the pre-extracted relational phrase embeddings and the clustering information for the plurality of pre-extracted relational phrase embeddings for each of the first plurality of sentences by one of the plurality of worker nodes; sending the first plurality of sentences and the pre-extracted relational phrase embeddings and clustering information for the pre-extracted relational phrase embeddings for each of the first plurality of sentences to the head node by one of the plurality of worker nodes; wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

In one aspect, a non-transitory computer-readable medium stores instructions that, when executed by one or more hardware processors, cause the one or more hardware processors to perform operations including: receiving a first entity and a second entity; accessing a corpus; retrieving a first plurality of sentences containing the first entity and the second entity from the corpus; identifying a plurality of relational phrases by extracting a relational phrase from each of the first plurality of sentences; and identifying one or more relationships between the first entity and the second entity.

In some embodiments, extracting the relational phrase from each of the first plurality of sentences includes using a dependency parser or a constituency parser to identify the relational phrase.

In some embodiments, the operations further include mapping each relational phrase in a pretrained vector space using a pretrained model; and clustering the plurality of relational phrases in the pretrained vector space.

In some embodiments, the operations further include ranking the one or more relationships based on clustering of the plurality of relational phrases.

In some embodiments, wherein the operations further include classifying the one or more relationships using a classification model; and training the classification model on the corpus using example labels, wherein each example label includes an entity pair and a class, wherein training the classification model includes receiving example labels; and for each example label: retrieving a plurality of training sentences containing the entity pairs from the corpus; identifying a plurality of classification relational phrases by extracting a relational phrase from each of the plurality of training sentences; and labeling the plurality of classification relational phrases with the class corresponding to the entity pair; mapping the plurality of labeled classification relational phrases for each example label in the pretrained vector space using the pretrained model; clustering the plurality of labeled classification relational phrases in the pretrained vector space.

In some embodiments, the operations further include mapping the plurality of relational phrases in the pretrained vector space; clustering the relational phrases and a plurality of classification relational phrases identified in training in the pretrained vector space; and assigning a label to each relational phrase based on the clustering of the plurality of relational phrases and the plurality of classification relational phrases in the pretrained vector space; and assigning a classification to each of the one or more relationships between the first entity and the second entity.

In some embodiments, the operations further include assigning a confidence score to the classification.

In some embodiments, the operations further include preprocessing the corpus by retrieving a second plurality of sentences from the corpus; extracting a plurality of entities from each of the second plurality of sentences; extracting a relational phrase for each pair of extracted entities; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the operations further include preprocessing the corpus by grouping the corpus into a plurality of chunks at a head node; sending each of the plurality of chunks to one of a plurality of worker nodes of a distributed cluster; retrieving a second plurality of sentences from one of the plurality of chunks of the corpus by one of the plurality of worker nodes; extracting a plurality of entities from each of the second plurality of sentences by one of the plurality of worker nodes; extracting relational phrase for each pair of extracted entities by one of the plurality of worker nodes; sending the plurality of extracted entities and the extracted relational phrases to the head node; mapping the extracted relational phrases in a pretrained vector space using a pretrained model to generate a plurality of extracted relational phrase embeddings; clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

In some embodiments, the operations further include accessing a preprocessed corpus, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities; and identifying the first plurality of relational phrases by using the pre-extracted relational phrase embeddings and the clustering information for the plurality of pre-extracted relational phrase embeddings for each of the first plurality of sentences.

In some embodiments, the operations further include sending the first entity and the second entity to each of a plurality of worker nodes; accessing a portion of a preprocessed corpus by one of the plurality of worker nodes, wherein the preprocessed corpus includes a mapping of a plurality of pre-extracted entities, a plurality of pre-extracted relational phrase embeddings, and clustering information for the plurality of pre-extracted relational phrase embeddings; retrieving the first plurality of sentences containing the first entity and the second entity from the corpus using the mapping of the plurality of pre-extracted entities by one of the plurality of worker nodes; identifying the plurality of relational phrases by using the pre-extracted relational phrase embeddings and the clustering information for the plurality of pre-extracted relational phrase embeddings for each of the first plurality of sentences by one of the plurality of worker nodes; sending the first plurality of sentences and the pre-extracted relational phrase embeddings and clustering information for the pre-extracted relational phrase embeddings for each of the first plurality of sentences to the head node by one of the plurality of worker nodes; wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

Any one of the embodiments disclosed herein may be properly combined with any other embodiment disclosed herein. The combination of any one of the embodiments disclosed herein with any other embodiments disclosed herein is expressly contemplated.

BRIEF DESCRIPTION OF THE DRAWINGS

The objects and advantages will be apparent upon consideration of the following detailed description, taken in conjunction with the accompanying drawings, in which like reference characters refer to like parts throughout, and in which:

FIG. 5B shows the top relationships between "nivolumab" and "pneumonitis," according to certain embodiments.

FIG. 5D shows sentences contributing the relationship "occurred" between "nivolumab" and "pneumonitis," according to certain embodiments.

FIG. 6A shows training statistics for an Adverse Event/Indication model used to classify relationships between drugs and diseases, according to certain embodiments.

FIG. 6C shows the sentences for "is used to treat" in an Adverse Event/Indication model used to classify relationships between drugs and diseases, according to certain embodiments.

DETAILED DESCRIPTION

Figure 1:
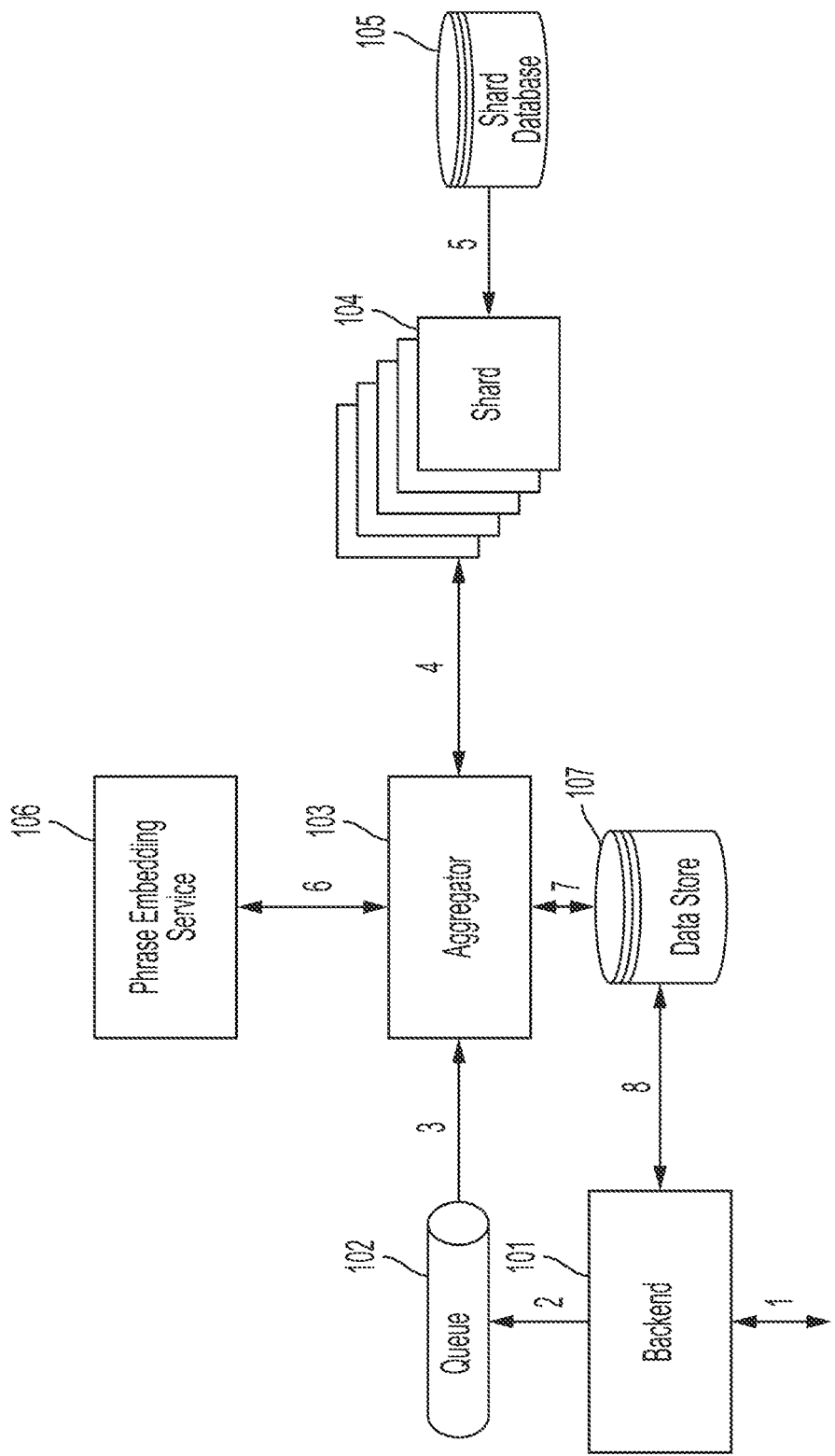
FIG. 1 shows a schematic of a system and method for determining relationships between entities, according to certain embodiments.

The systems and methods described herein offer a working solution of harvesting relationships between phrases or entities, without the need for human labeling, by a hybrid approach of leveraging a dependency or a constituency parser to harvest relationship candidates and clustering in the vector space of a deep learning model (supervised or self-supervised model), to determine the similarity of relationship fragments linking two or more phrases or entities.

The systems and methods described herein can determine relationships between entities and classify them into known groups (e.g., classifications) to assist with quickly understanding the type of relationship between entities. The systems and methods and systems described herein can order information between the terms, making perusal of documents containing the entities intuitive and straightforward.

In one aspect is disclosed a system and method harvest relationships between phrases or entities in a sentence in an unsupervised fashion.

In some embodiments, the system and method leverage similarity of embeddings for fragments relating the phrases in a sentence.

In some embodiments, the similarity of embeddings is used to cluster or group similar fragments for relating the phrases in a sentence.

In some embodiments, the robustness relationships harvested between the two or more terms is qualified by the nature of distribution of fragments relating the two ore more phrases in a corpus of text.

In some embodiments, the nature of distribution of fragments is quantified by clustering the fragments in a vector space of a machine learning model that could be supervised or self-supervised.

In some embodiments, the system and method summarizes the contents of a corpus by the relationships harvested from the document for given entities.

In some embodiments, the system and method classifies relationships between entities given example labels.

In some embodiments, the system and method includes auto tagging data, for example, scaling human tagging for other supervised models like Bidirectional Encoder Models from Transformers (BERT)

In some embodiments, to identify relationships between entities, the system trains a parser (e.g., a dependency parser or constituency parser) and a pretrained model. In some embodiments, a dependency parser is trained using labeled dependencies that indicate relationships between words in the sentences of a corpus. In some embodiments, a constituency parser is trained using labeled constituencies that indicate relationships between words in the sentences of a corpus. The dependency parser or constituency parser runs on sentences in the corpus and identifies relationships between words or entities in the sentences, thereby learning how to identify relational phrases that connect entities and describe relationships between entities. This learning can be applied to a new corpus to learn additional phrases that describe relationships. In some embodiments, the pretrained model is trained by feeding a corpus with unlabeled data into the system. In these embodiments, the unlabeled data can be broken up into smaller pieces and passed to a neural network so the pretrained model can learn the relevance of words or entities in association with each other.

In some embodiments, once the dependency parser or constituency parser and pretrained models are trained, relationships between entities of interest can be identified using the following illustrative method. First, the system identifies sentences that include the entities. These sentences are run through the dependency parser or constituency parser to identify relational phrases (e.g., relational phrases that connect the entities of interest). The relational phrases are run through the pretrained model to identify similar phrases that can be grouped together into relationships. Then, the system reports relationships between the entities and ranks those relationships based on how many times each relationship appears.

In some embodiments, to classify relationships between entities into different categories, a classification model is trained using the following illustrative method. The user enters pairs of entities and provides a category or label for each pair. The system applies the pairs to the corpus and retrieves sentences containing each pair. In some embodiments, the dependency parser or constituency parser identifies relational phrase for each pair, and these phrases are run through the pretrained model. In this way, the classification model can learn the type of relational phrases that are used for each category of relationship. The classification model can then be applied to a new corpus, where it can learn additional phrases for each category that are similar to the phrases previously identified by the classification model.

In some embodiments, once the classification model is trained, relationships between entities can be classified to indicate the type of relationship. For example, after the pretrained model identifies the relational phrases for the entities, these relational phrases are compared to the phrases identified by the classification model. The classification model can provide a category for the relationship based on the similarity between the relational phrases for the two entities and the phrases associated with each category in the classification model. The confidence in the classification can be determined based on the similarity between the relational phrases for the entities and the phrases for the category.

Embodiments of the present disclosure can be applied to various industries and domains. However, for illustrative purposes, the present disclosure focuses on the healthcare/medical space. In some embodiments, the following terms can be used interchangeably: "entity," "term," and "token." Moreover, in some embodiments, the following terms can be used interchangeably: "embeddings" and "vectors." In some embodiments the following terms can be used interchangeably: "fragments relating the phrases," "relational phrases," and "fragments relating the entities." In some embodiments the following terms can be used interchangeably: "class" or "label."

In some embodiments, the systems and methods can determine relationships between two or more entities by retrieving sentences containing the entities from a corpus of text. In some embodiments, sentences containing all entities of interest are retrieved. A corpus can include any source of data, e.g., a collection of text documents. A corpus can relate to general subject matter or to domain-specific subject matter. For example, in some embodiments, the corpus is a biomedical corpus. Non-limiting examples of sources of a biomedical corpus include pharmaceutical company websites, the Federal Drug Administration (FDA, e.g. Drugs@FDA, the Federal Adverse Event Reporting System), clinical trials (e.g., clinicaltrials.gov), Securities and Exchange Commission filings, Wikipedia, and scientific literature (e.g., Pubmed).

In some embodiments, the systems and methods can determine relationships between two entities. In some embodiments, the systems and methods described herein can determine relationships between more than two entities. For example, where there are n entities, the systems and methods can determine n−1 relationships among the entities. In some embodiments, where relationships are determined for more than two entities, relationships between pairs of entities are determined. For example, if there are three entities (A, B, and C), the methods can determine a relationship between A and B and a relationship between B and C. In these embodiments, the relationships are clustered based on the number of occurrences for each relationship.

In some embodiments, a relationship between two or more entities can be determined by retrieving sentences containing the entities from a corpus and analyzing relational phrases in these sentences. In some embodiments, sentences containing synonyms of the entities are also retrieved. Synonyms can be entered by the user or identified by the model from a database. In some embodiments, the entities are in the same sentence. In other embodiments, the entities are spread across multiple sentences but located near each other, for example, within a threshold number of words or within adjacent sentences. Relational phrases are phrases in the sentences that indicate a relationship between entities of interest. In some embodiments, relational phrases are phrases connecting the entities of interest. In some embodiments, relational phrases are verb phrases. Non-limiting illustrative relational phrases include "occurred," "is associated," "is characterized," "have indicated," "is used to treat," "has been approved for the treatment of," and "has been shown to be effective." In some embodiments, relational phrases can be identified by parsing sentences of a corpus.

In some embodiments, the systems and methods use a dependency tree to determine relationships between two or more entities, for example, by using the dependency tree to identify relational phrases. For example, a dependency parser can be used to identify relational phrases in the sentences of the corpus. In some embodiments, a model is configured with a dependency parser that is trained to generate a dependency parse of each sentence in the corpus containing the entities. In some embodiments, the dependency parser is used to extract dependency between terms in a sentence and outputs a dependency tree containing the sentence structure. Given a dependency tree, a graph can be constructed to find a path between the two terms of interest (entities), depending on the phrases encountered in the path. The dependency parser tags terms with their part-of-speech (e.g., noun, verb, adjective, etc.) and identifies relationships among terms in the sentence (e.g., subject, object, modifier, etc.). For example, a dependency parser can identify dependency among words, e.g., nominal subject, indirect object. In some embodiments, the dependency parser generates dependency trees which are used to identify candidate relational phrases.

In some embodiments, the dependency parser is pretrained on a corpus, e.g., a corpus of biomedical data. In some embodiments, dependency parsers are trained using a supervised approach. In this approach, the dependency parser is trained using a labeled set of dependencies between words. The labeled set of dependencies are used to parse sentences in the corpus and create a dependency tree for the sentences. In some embodiments, the labeled set of dependencies are obtained from a treebank for the language used in the corpus.

In some embodiments, the systems and methods use a constituency tree to determine relationships between two or more entities, for example, by using the constituency tree to identify relational phrases. For example, a constituency parser can be used to identify relational phrases in the sentences of the corpus. In some embodiments, a model is configured with a constituency parser that is trained to generate a constituency parse of each sentence in the corpus containing the entities. In some embodiments, the constituency parser is used to identify the hierarchy of phrases in a sentences and outputs a constituency tree containing the sentence structure. For example, a constituency parser can identify noun phrases, verb phrases, and prepositional phrases. Given a constituency tree, a graph can be constructed to find a path between the two terms of interest (entities). The constituency parser tags phrases by category (e.g., noun, verb, prepositional, etc.). In some embodiments, the constituency parser generates constituency trees which are used to identify candidate relational phrases. In some embodiments, the path between two entities and the distance of the entities from a candidate relational phrase can indicate how well the relational phrase describes the relationship between two entities.

In some embodiments, the constituency parser is pretrained on a corpus, e.g., a corpus of biomedical data. In some embodiments, constituency parsers are trained using a supervised approach. In this approach, the constituency parser is trained using a labeled set of constituencies. The labeled set of constituencies are used to parse sentences in the corpus and create a constituency tree for the sentences. In some embodiments, the labeled set of constituencies are obtained from a treebank for the language used in the corpus.

In some embodiments, relationships between entities are identified using a pretrained machine learning model. In some embodiments, relational phrases are identified using dependency parsers and vectorized using the pretrained model. In some embodiments, relational phrases are identified using constituency parsers and vectorized using the pretrained model. In some embodiments, the pretrained model is generated by parsing through documents in the corpora and creating embeddings for each entity in the corpus. The pretrained model can be supervised or self-supervised. In some embodiments, the pretrained model is trained by feeding in the corpus with unlabeled data. In some embodiments, the method of pre-training the model includes of tokenizing the data of the corpus (e.g., by breaking the data into smaller pieces) and passing the tokenized data to a neural network to learn the relevance of the words in association to each other and then create word embeddings. In some embodiments, the pretrained model learns relational phrases on a corpus. Such a pretrained model can then operate on any new corpus (e.g., a biomedical corpus) to identify relationships between entities. In some embodiments, the pretrained model vectorizes relational phrases and maps the relational phrases in the vector space of the pretrained model. Relational phrases are vectorized by vectorizing each term of the phrase and coupling the terms in the pretrained model's own framework. In some embodiments, the robustness of a relationship between entities is qualified by the nature of the distribution or clustering of those relational phrases in the pretrained vector space. For example, the nature of the distribution of relational phrases can be quantified based on clustering of the relational phrases in the pretrained vector space.

In some embodiments, groups of two or more similar relational phrases can be grouped together as a single relationship. The similarity of relational phrases is reflected in the phrase embeddings and the mapping of the relational phrases in the pretrained vector space. For example, phrases are similar if they are close to each other in the pretrained vector space. In some embodiments, when relational phrases are mapped in the pretrained vector space, two or more relational phrases form clusters. Clustering allows grouping of similar relational phrases so similar context and meaning can be determined from different phrases. If two or more relational phrases are within a threshold cosine distance, those relational phrases can be grouped together when determining relationships between entities. The threshold can be determined by a user or automatically. For example, the pretrained model may group "is characterized" and "have indicated" as a single relationship based on the similarity of the two relational phrases, as determined by the cosine distance between the relational phrases in the pretrained vector space. In some embodiments, a robustness score can be calculated for a relationship based on similar relational phrases can be determined by clustering of the relational phrases. For example, this robustness score can be based on the cosine distance between the relational phrases grouped into the relationship.

FIG. 1 shows a schematic of an illustrative system and method for determining relationships between words or entities. First, at the backend 101, a request is made to compute a relationship between two or more entities, creating a task (1). Then, the task is added to a queue 102 (2). Next, an aggregator 103 picks up a task from the queue (3). The aggregator 103 sends request to shards 104 to retrieve sentence level relational phrases for the entities (4). The shard 104 reads the sentences containing the entities of interest and corresponding the dependency trees from its database 105 (5). The dependency trees are used to extract the relational phrases from each sentence. Then phrase embeddings for the relational phrases of each sentence are computed using a phrase embedding service 106 which feeds each relational phrase through the pretrained model vector space (6). The aggregator 103 clusters the relational phrases using their embeddings and writes the results to a data store 107 (7). Finally, relationship extraction results are retrieved from the datastore 107 to the backend 101 so they can be reported to the user (8).

Illustrative relationship results to report include a list of relationships, an ordered list of relationships, a number of relationships identified, a number of unique relationships, a number of documents, a number of documents with relationships, a number of sentences, source entropy, sentences contributing to the relationships, sources of sentences contributing to the relationships, cluster size of each relationship, percentage for each relationship, and incidence of each relationship over time. In some embodiments, a list of relationships can be ordered to show a user the most relevant relationships. In some embodiment, as list of relationships can be ordered by cluster size.

In some embodiments, the systems and methods identify enriched entities. Enriched entities can be identified using a separate framework that identifies other named entities present in relevant sentences (e.g., sentences containing the entities of interest) and the frequency of these entities. In some embodiments, identifying enriched entities can identify other entities of interest that are relevant to the relationships extracted.

In some embodiments, the systems and methods allow the user to create models that classify relational phrases and thereby classify relationships. Classification can provide additional information to the user and creates anchor relationships. A classification model can be trained using example labels. In some embodiments, a set of example labels for training includes a list of entity pairs and a class or label for each entity pair. In some embodiments, classification models are trained by a human, for example, using user-entered pairs of entities that a user has classified, i.e., using example labels generated by a user. During training, the model identifies sentences in the corpus that include the user-entered pairs, extracts the relational phrases for each pair, and assigns the user-entered classification or label for each pair to the corresponding relational phrases for each pair. In other embodiments, classification models are trained using example labels generated by auto-tagging of data. For example, user tagging can be scaled using supervised models (e.g., Bidirectional Encoder Models from Transformers (BERT)). Auto-tagging can be used to augment datasets and validate manually-tagged data.

In some embodiments, the model learns how the classification is described in the corpus based on the example labels. The model can identify an initial set of relational phrases connecting the entity pairs in the example labels and assign the initial relational phrases a classification based on the example labels. The model can then be applied to the corpus or to a new corpus to find new descriptions of the classification by identifying phrases describing similar relationships. Similar relational phrases or relationships can be found by vectorizing the relational phrases in corpus and mapping in the pretrained space with the initial relational phrases. Similar phrases will be within a threshold distance of the initial relational phrases. For example, for the classification "Adverse Effect," a user may enter pairs such as "drug" and "insomnia." The model would learn how adverse effects are described in the corpus (e.g., which relational phrases are used for the entity pairs) and could be applied to the corpus to identify new descriptions of adverse effects (e.g., new relational phrases that are similar to those previously identified). In this way, the classification model provides a set of labeled relational phrases associated with each classification.

In some embodiments, the model provides a classification for the relationship between the entities and a confidence score for that classification. During classification, relational phrases extracted for the entities of interest can be vectorized and clustered in the pretrained vector space. The labeled relational phrases identified by the classification model can be similarly vectorized and clustered in the pretrained vector pace. Each extracted relational phrase can be classified based in its similarity to the labeled relational phrases identified by the classification model. In some embodiments, similarity is determined based on the cosine distance between relational phrases. In some embodiments, a confidence score is calculated based on a combination of how many sentences are identified, how close the user-entered terms are to relational phrases, and how strongly certain phrases describe the relationship. In some embodiments, the confidence score of a classification is determined by looking at how many extracted relationships for the entities of interest are similar to relevant relationships that were identified in training. Similarity can be assessed based on the distance between the vectorized relational phrases in the pretrained vector space.

Figure 2:
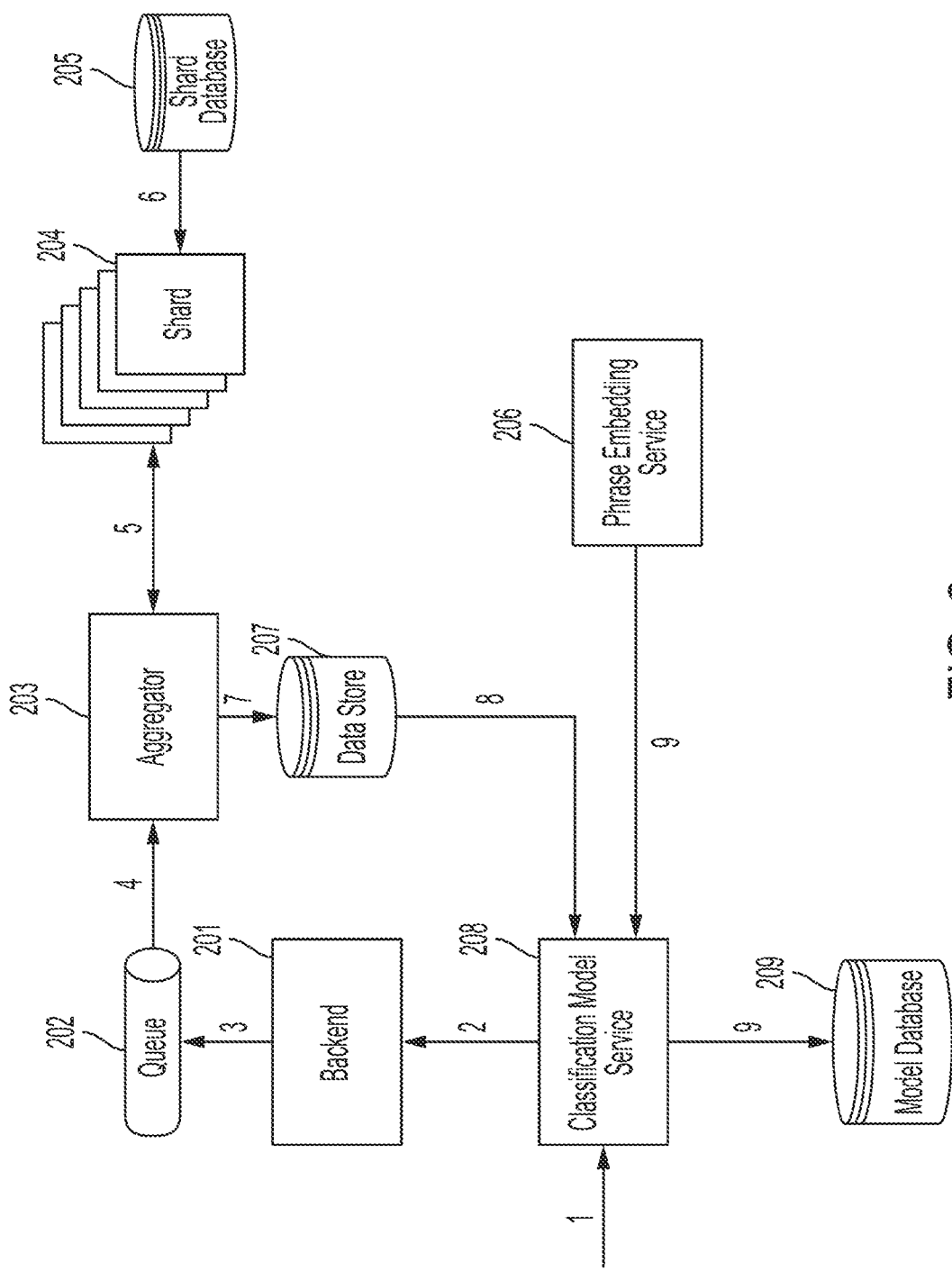
FIG. 2 shows a schematic of a system and method for training a classification model for classifying relationships between entities, according to certain embodiments.

FIG. 2 shows a schematic of an illustrative system and method for training a classification model to determine relationships between entities. First, a request is made to train a model using the classification model service 208 by providing example labels that include entity pairs and a class for each entity pair (1). These example labels can be manually labeled or generated by auto-tagging the data. Then, at the backend 201 a request to compute relational phrases for the entity pairs is made (2). Then, the task is added to the queue 202 (3). Next, an aggregator 203 picks up a task from the queue (4). The aggregator sends the request to shards 204 to retrieve sentence-level relational phrases for entity pairs (5). The shard 204 reads the sentences containing the entity pairs and the corresponding dependency trees from its database 205 (6). The dependency trees are used to extract the relational phrases from each sentence. Next, relational phrases are written to data store 207 (7). Next, relational phrases are read (8). Next, phrase embeddings are computed using the phrase embedding service 206 (9). The phrase embedding service inputs the relational phrases and outputs a vector representation of the relational phrases. The vectorized relational phrases are clustered to produce relevant features for use in classification. Relational phrases can be associated with a classification based on clustering. Finally, the trained model associating relational phrases with classifications is written to the database 209.

In some embodiments, the systems and methods disclosed herein include preprocessing of documents or a parallel and distributed approach to enable faster determination of relationships. In some embodiments, such systems and methods enable scaling up of the systems and methods disclosed herein for determination of relationships.

In these embodiments, a data generator or datagen can be used to complete computationally intensive tasks before a request is made by a real-time system to compute a relationship between two or more entities. For example, a data generator can be used to complete operations including extracting entities and relational phrases from documents of a corpus, preprocessing documents, creating an index of entities, create phrase embeddings, and performing clustering on these phrase embeddings, and storing this information for later use by a real-time system. In some embodiments, the entities are extracted from a corpus using a predetermined set of entities of interest. In some embodiments, a predetermined set of entities incudes a database of entities, e.g., a database of drugs, diseases, and combinations thereof. In some embodiments, the data generator can rerun preprocessing operations if new entities of interest are added or if new documents are added to the corpus.

In some embodiments, a data generator identifies relational phrases by parsing the sentences of the corpus. In some embodiments, a data generator identifies relational phrases using a dependency parser. In some embodiments, a data generator identifies relational phrases using a constituency parser. In some embodiments, a data generator uses a constituency parser because a constituency parser can provide additional flexibility in identifying verb phrases, for example, because a constituency parser can break down each word in the sentences. This additional flexibility can make it easier to identify verb phrases during a data generator's preprocessing steps when the entities of interest are not yet known. For example, when extracting entities and relational phrases, a data generator does not always know yet if a relationship exists between extracted entities.

In some embodiments, preprocessing performed by a data generator can be run separately from a real-time system and be used to feed data to the real-time system when a request is made by the real-time system to compute a relationship between two or more entities of interest of interest. One illustrative benefit of preprocessing documents before a request is made by the real-time system is that tasks can be completed quickly (e.g., within 100-200 ms) because the preprocessing (e.g., extracting entities and relational phrases, phrase embeddings, clustering) has already been completed. Another illustrative benefit is that a new task can be created before a previous task is complete. In some embodiments, by using a data generator that preprocesses documents, the system does not need to perform computationally intensive steps such as retrieving sentences with the entities of interest, extracting relational phrases, mapping the relational phrases in vector space, and clustering the relational phrases each time the user submits a request to identify a relationship between entities. Instead, a real-time system can simply fetch previously generated or extracted phrase embeddings and clustering information for sentences containing the entities of interest using an index for the entities. Then, a real-time system can determine relationships using the previously generated phrase embeddings and clustering information for previously extracted sentences containing the entities of interest. In some embodiments, if entities were not previously extracted by the data generator, the real-time system can communicate to the data generator to add new entities of interest and rerun the preprocessing steps.

In some embodiments, systems and methods using a parallel and distributed approach allow running of these systems and methods on multiple machines and allow parallelization on a single machine. For example, a parallel and distributed system can include one head node and any number of worker nodes. In some embodiments, worker nodes can be distributed across multiple physical machines, virtual machines, or partitions. In some embodiments, a single machine or partition can include one or more worker nodes, depending on the number of parallel processes. One illustrative benefit of such a parallel and distributed approach over a batch processing approach is that a new task can be started, for example by a different worker node, before a previous task is complete.

In some embodiments, a data generator can use a parallel and distributed system. In some embodiments, a data generator using a parallel and distributed system includes a head node that can group documents of a corpus into chunks. These chunks can be placed in a queue for assignment to worker nodes. Then, each worker node can complete preprocessing steps on each chunk of data, including splitting text into sentences, tokenizing sentences, creating a constituency tree or dependency tree, extracting entities, and extracting phrases. In some embodiments, the extracted phrases can be mapped in a pretrained vector space to create phrase embeddings and clustered to generate cluster information. In some embodiments, the documents can be processed to include information such as an index of entities and relational phrases or a mapping of entities to sentences where they occur.

Figure 3:
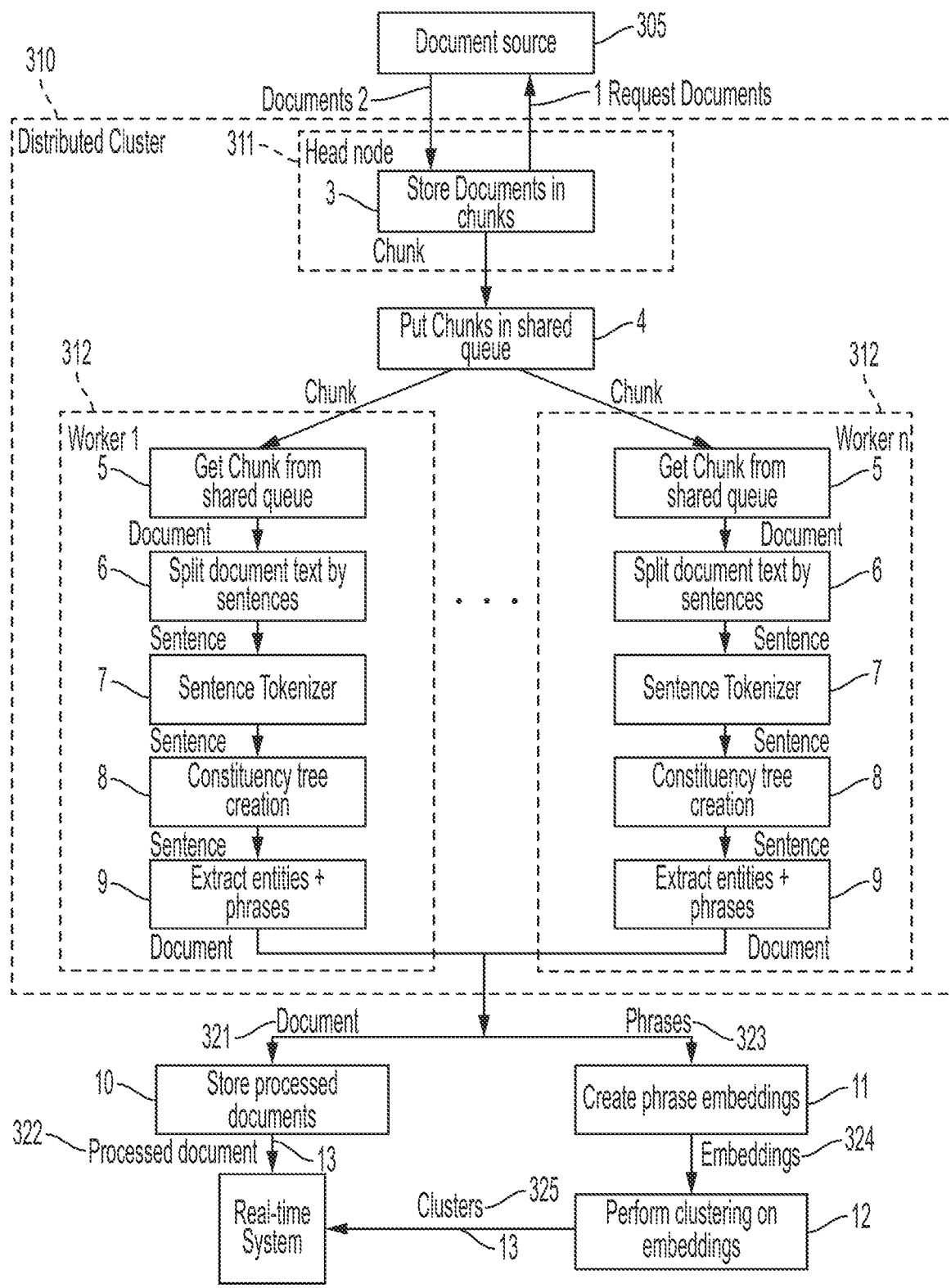
FIG. 3 shows a schematic of a system and method for a data generator for determining relationships between entities using a parallel and distributed system, according to certain embodiments.

FIG. 3 shows a schematic of an illustrative system and method for a data generator for determining relationships between entities using a parallel and distributed system. As shown in FIG. 3, this illustrative system includes a distributed cluster 310 that includes a head node 311 and one or more workers 312. In this example, workers are shown as "worker 1" through "worker n." The system can include n workers on m machines. In some embodiments, n=m (e.g., each worker is on a different machine), while in other embodiments n>m (e.g., one or more workers on each machine). In this illustrative method, the head node 311 sends a request to a data source or corpus 305 containing text documents to process (1), and the data source 305 sends documents to the head node 311 (2). The head node 311 receives the documents and groups them into chunks (3). In some embodiments, documents are grouped into chunks randomly. For example, documents can be grouped into chunks randomly because some documents are denser than others. In some embodiments, the head node sets a minimum number of documents (e.g., 20,000) for each chunk. The chunks are then put in a shared queue between all the worker nodes 312 (4).

In the illustrative system in FIG. 3, each worker (312) takes a chunk from the queue (5). Each worker 312 goes through the documents in the chunk and extracts the text from it. The extracted text is then split into a list of sentences (6). The sentences are then further split into a list of entities while maintaining sentence boundaries using a sentence tokenizer (7). In this example, the tokenized sentence is then used to create a constituency tree (8). The constituency tree is then parsed to extract entities and relational phrases (9). In some embodiments, a constituency parse can identify the hierarchy of phrases in a sentences, including noun phrases, verb phrases, and prepositional phrases. The generated constituency tree, entities, and relational phrases can be added to the documents 321 along with the corresponding sentences to create processed documents 322. In some embodiments, the processed documents include an index (e.g., to locate entities) or mapping of entities to sentences in which they occur. The processed documents can be stored to be used later in the real-time system (10). The relational phrases 323 are used to create phrase embeddings 324 for each relational phrase (11). After the workers have extracted relational phrases from the chunks of the corpus, the embedding data from the workers is then combined and run through a clustering algorithm (e.g., using a pretrained model) to create clusters 325 (12). The clusters and documents can then be stored and sent to be used by the real-time system (13).

In some embodiments, when a real-time system using a parallel and distributed system receives a request or query with entities of interest from a user (e.g., via a user interface), a head node can create or fetch workers to identify relational phrases from preprocessed data generated by a data generator. In these embodiments, each worker can be assigned a portion of preprocessed documents from the corpus. Each worker then fetches sentences containing the entities of interest from the preprocessed documents and fetches previously extracted data for each sentence (e.g., one or more of constituency trees, dependency trees, relational phrases, and phrase embeddings for each relational phrase). Each worker can then identify relevant relational phrases, for example, using one or more of constituency trees, dependency trees, phrase embeddings, and clustering information of the relational phrases. Next, each worker can send relevant relational phrases and their clustering information to the head node, which can merge the relational phrases and associated clustering data from the worker nodes to identify relevant relationships between the entities of interest. In some embodiments, the head node can also provide a classification for the relationships between the entities of interest. Relevant relationships and classification can then be shared with the user via the user interface.

Figure 4:
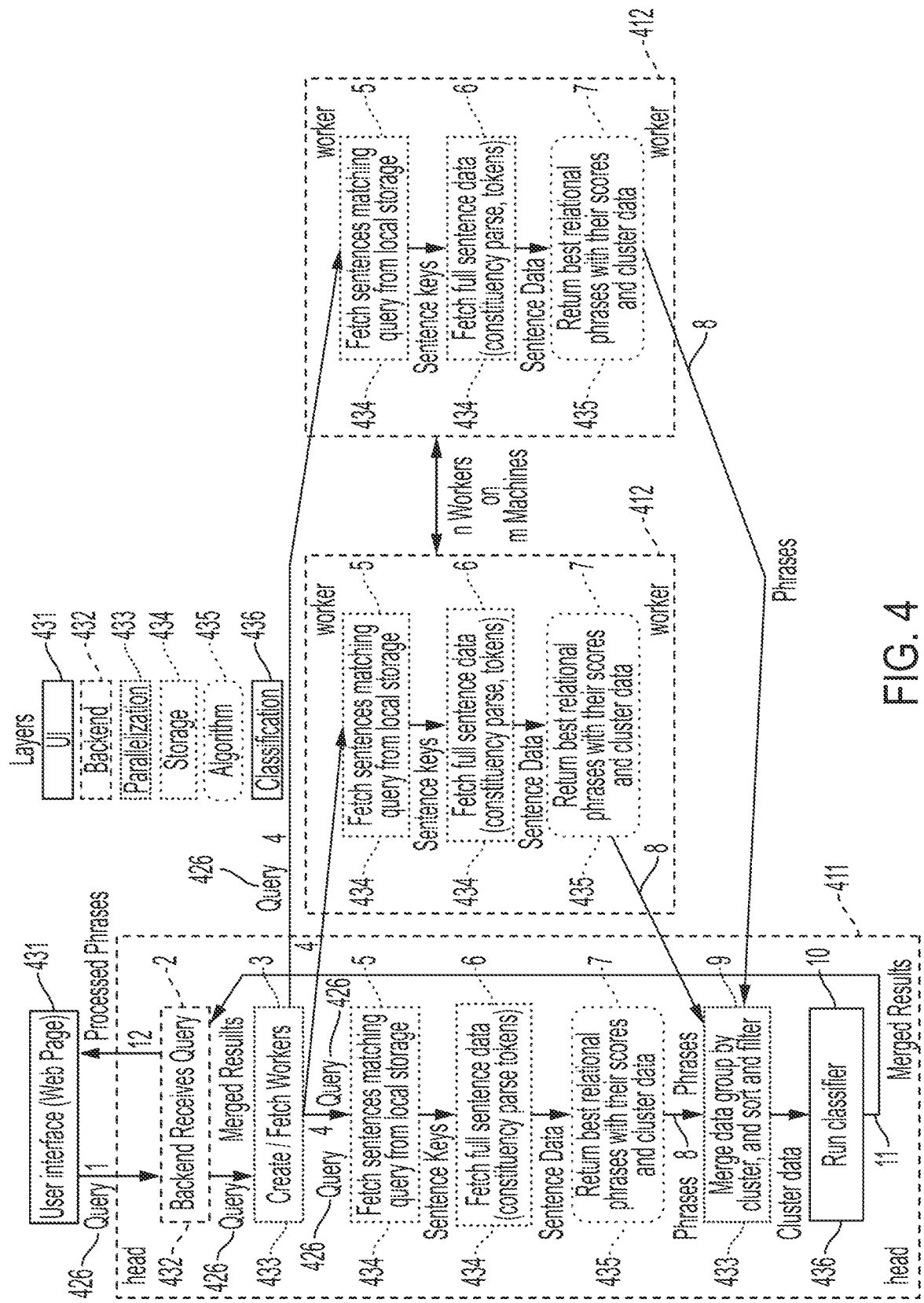
FIG. 4 shows a schematic of a system and method for a real time system for determining relationships between entities using a parallel and distributed system, according to certain embodiments.

FIG. 4 shows a schematic of an illustrative system and method for a real-time system for determining relationships between entities using a parallel and distributed system. This illustrative real-time system includes 6 layers: a user interface layer 431, a backend layer 432, a parallelization layer 433, a storage layer 434, an algorithm layer 435, and a classification layer 436. This illustrative system also includes a distributed cluster that includes a head node 411 and one or more workers 412. The system can include n workers on m machines. In some embodiments, n=m (e.g., each worker is on a different machine), while in other embodiments n>m (e.g., one or more workers on each machine). In this illustrative method, a user gives two entities or tokens as an input or query in a user interface (UI) 431 (1). Non-limiting examples of a user interface include a webpage, an application programming interface (API), a command line, or a local program on the user's machine. In some embodiments, the user interface is configured to connect to a cloud or network. This user query is sent to the backend 432 which has the capacity for hosting many workers 412 running in parallel (e.g. a cluster with many machines and many CPUs) (2). In some embodiments, the backend operates in a cloud system. In a parallelization layer 433, the backend 432 fetches existing workers or creates workers and makes sure they are ready to run computations (3). Each worker is then sent the user's query (4).

In the illustrative system in FIG. 4, within the storage layer 434, each worker 412 retrieves information from storage (e.g., storage created by a data generator such as one described in relation to FIG. 3). First, each worker fetches sentences that includes the entities in the user's query (5). In some embodiments, each worker has a different chunk of the data. In some embodiments, each worker is assigned a chunk of data randomly. In some embodiments, this data includes a mapping of entities to sentences in which they occur. This mapping can be generated by a data generator, e.g., the data generator described in relation to FIG. 3. In some embodiments, a mapping functions as an index to identify which sentences in the storage include the entities in the user's query. Each worker can use this mapping to find which sentences include the entities from the user' query. In some embodiments, a mapping can be referred to as a "sentence key." In some embodiments, using a mapping allows fetching of these sentences more quickly than reading through each of the more complex sentence objects one by one. After the worker finds the relevant sentences containing the entities from the user's query, the worker can fetch other preprocessed data (e.g., from a data generator) about these sentences (6). This information can include one or more of the constituency tree, dependency tree form of the structure of the sentences, possible relational phrases that exist within the sentences, and phrase embeddings for each relational phrase.

Then, in the algorithm layer 435 of the illustrative system in FIG. 4, each worker determines the relevant relational phrases (7). For each possible relational phrase, the worker can use the constituency tree to determine whether or not a given phrase is a relationship between the entities in the user's query or whether the phrase is irrelevant to the entities. If the phrase is irrelevant, it is discarded. Any relevant relational phrases can be given a score from the constituency tree for how well they describe the relationship between the two entities. In some embodiments, this score is determined at a sentence level by determining the distance of the entities from the relational phrase and the path between the entities. Phrases with lower scores can also be filtered out. The algorithm layer 435 can pull previously extracted cluster information for relevant relational phrases and store the cluster information (including cluster identification (cluster id)) with the corresponding relational phrases.

In the illustrative system in FIG. 4, after relevant relational phrases and their corresponding cluster identifications are found from each worker's chunk of the data, they can then be sent back to the 'head' 411 backend process in the parallelization layer 433 (8). In the parallelization layer, the results from the workers 412 are merged (9). In some embodiments, results can be merged by sorting by number of phrases in a cluster or by removing duplicate sentences. In some embodiments, results can be merged by giving preferences to certain sentences depending on the corpus from which those sentences were extracted. In some embodiments, a user defines criteria for giving preference to certain sentences or types of source documents. For example, sentences from published journals or peer-reviewed sources can be given preference over sentences from other sources such as news articles. The results can be combined into one list of phrase objects from all workers. This list of phrase objects can include the relevant relational phrase along with other data like cluster id and source document. The list of phrase objects can be split into groups by cluster id, resulting in groups of phrases with similar meanings that can be summarized by just a few phrases from the group. In some embodiments, a cluster id is an arbitrary number assigned to a cluster.

In some embodiments, the illustrative system in FIG. 4, a label can be assigned to the relational phrases using a classification model, as discussed above (10). In these embodiments, the cluster ids from the relevant relational phrases are passed into a pre-trained classification model (e.g., trained as described in relation to FIG. 2), which can determine a label given a set of cluster ids for a query can determine label. Non-limiting examples of labels include 'Adverse Event' or 'Indication.' After classification, the classification and the merged and grouped results, including relational phrases cluster information, can be sent back to the backend layer (11), which then sends results to the user interface for display to the user (12). Alternatively, if no labels are assigned using a classification model, results can be sent to the backend after merging results from all workers.

Examples

Certain embodiments will now be described in the following non-limiting examples.

Figure 5A:
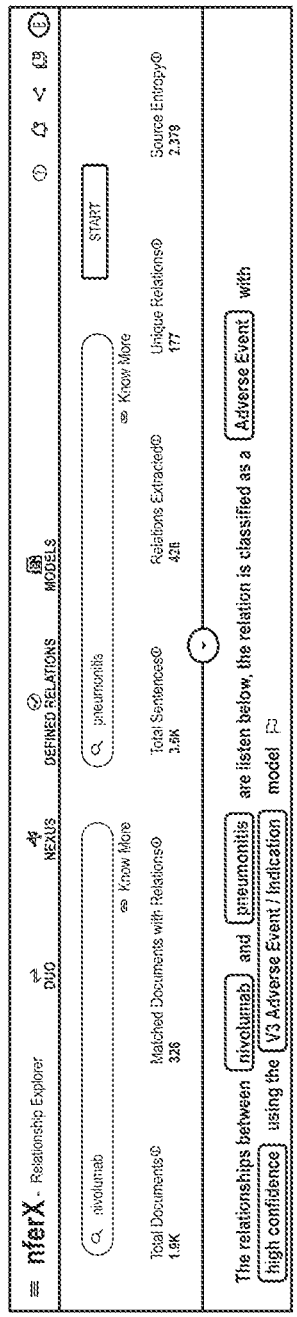
FIG. 5A shows the classification of the relationship between "nivolumab" and "pneumonitis," according to certain embodiments.

FIGS. 5A-5D show the relationship and visualization of the relationship between two illustrative entities: the drug "nivolumab" and the disease "pneumonitis." FIG. 5A shows a summary of the relationship results. As shown in FIG. 5A, after the two tokens or entities ("nivolumab" and "pneumonitis") in this example are entered, the most relevant relationships and a classification are displayed. FIG. 5A shows that the relationship between "nivolumab" and "pneumonitis" was classified as an "Adverse Event" with high confidence using an adverse event/indication classification model. Users can see that the relationship between nivolumab and pneumonitis is classified as an adverse event associated with the drug. FIG. 5A also shows the total number of documents with the two entities, the total number of documents with relationship, the total number of sentences with the two entities, the number of relationships determined, the number of unique relationships, and source entropy. Source entropy is determined by the source of the documents from which the sentences for the relevant tokens are extracted. Source entropy depends on the type of source (e.g. journal or newspaper), and the number of mentions of the two tokens in the source. This information can provide the user an indication of confidence in the model for the reported classification.

FIG. 5B shows the top relationships between "nivolumab" and "pneumonitis." The top relationship identified was "occurred," with a cluster size of 220 and accounting for 51.4% of sentences analyzed. Other top relationships included "is associated," "was observed," and "was discontinued," "commonly occurs," and "developed." The terms in ovals are enriched terms, which are other entities of potential interest in the retrieved sentences. The enriched terms are identified using a separate framework that identifies other terms that are present in the retrieved sentences, and the frequency with which those terms appear. The relationships identified are ordered based on cluster size. Ordering relationships by cluster size can show the most frequent relationships identified between the entities. Ordering sentences based on relationship clusters helps the user peruse information quickly and bring up the most relevant information to the top.

Figure 5C:
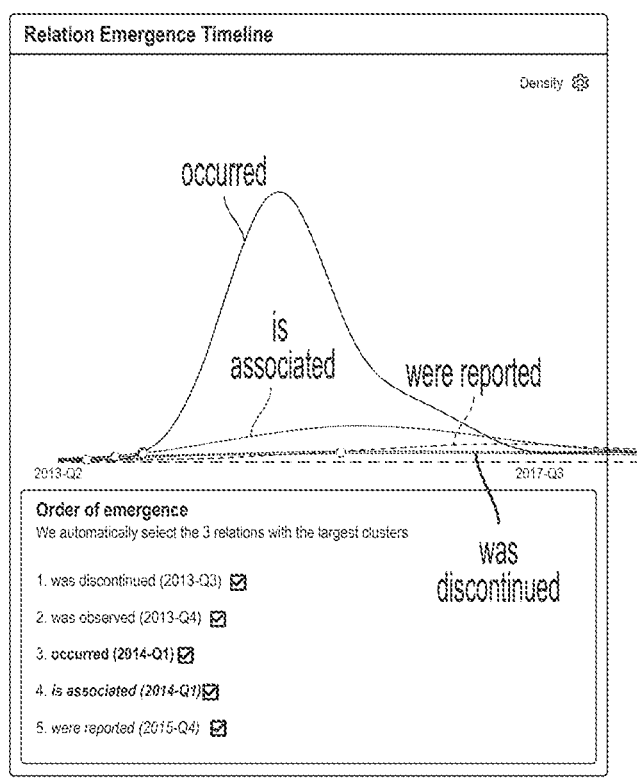
FIG. 5C shows the incidence of each relationship between "nivolumab" and "pneumonitis" over time, according to certain embodiments.

FIG. 5C shows the incidence of each relationship over time. This visualization enables users to identify the timeframe in which the relationship emerged in the corpus. A relationship is determined to have emerged when occurrences surpass a threshold. Here, "was discontinued" first emerged in the third quarter of 2013, "was observed" first emerged in the fourth quarter of 2013, "occurred" and "is associated" first emerged in the first quarter of 2014, and "were reported" first emerged in the fourth quarter of 2015.

After the user clicks on a relationship, the sentences contributing to that relationship and the source of each sentence are displayed. Expanding on a relationship opens up all sentences from literature containing the entities and the specified relationship. FIG. 5D shows sentences contributing to the relationship "occurred" between "nivolumab" and "pneumonitis." In FIG. 5D, the two entities are shown in bold, while the relational phrase "occurred" is shown in bold italics. The display also shows sentences containing OPDIVO, a synonym for nivolumab.

Figure 6B:
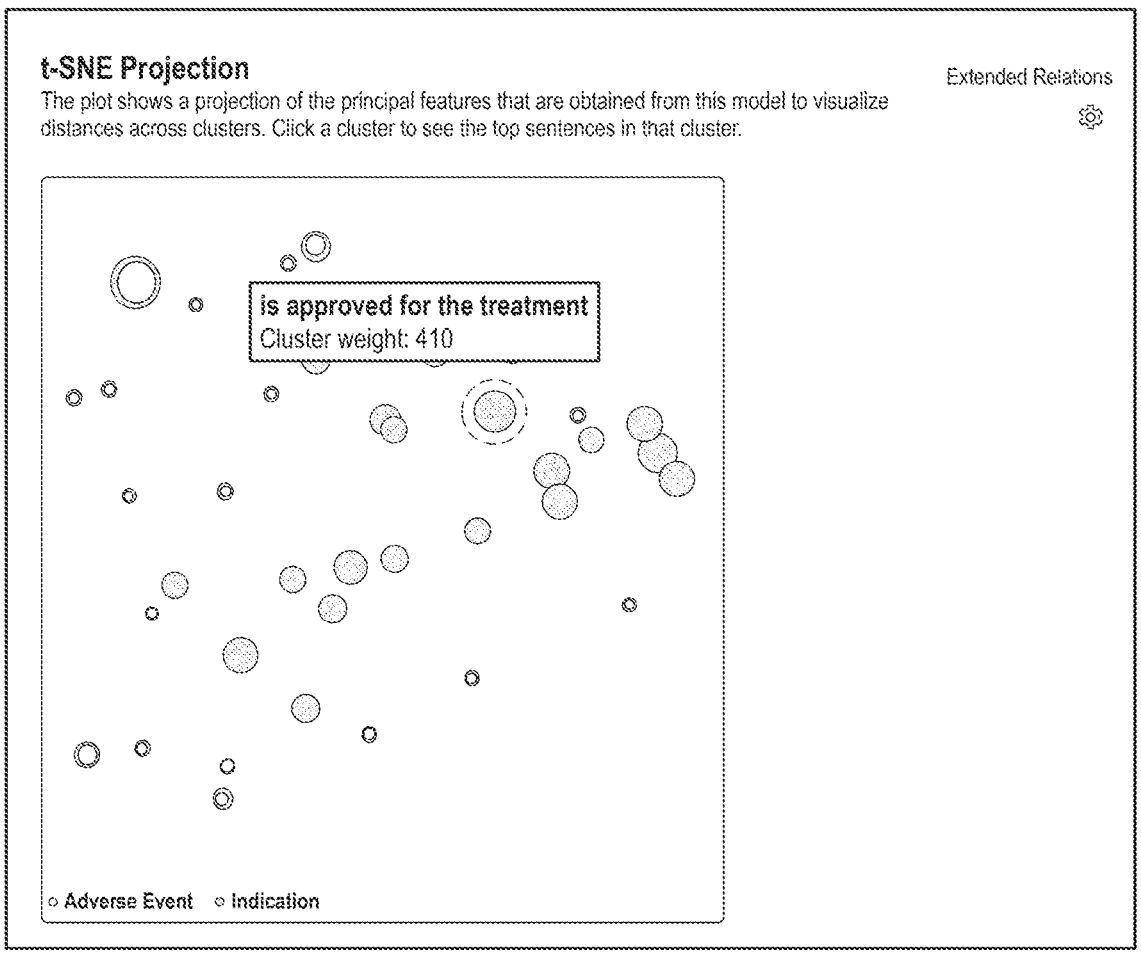
FIG. 6B shows the t-distributed stochastic neighbor embedding (t-SNE) projection for an Adverse Event/Indication model used to classify relationships between drugs and diseases, according to certain embodiments.

FIGS. 6A-6C show the results of training an Adverse Event/Indication classification model used to classify relationships between drugs and diseases. The model was trained with user-entered pairs of drugs and diseases where the user classified the relationship between each drug and disease as "adverse event" or "indication." FIG. 6A shows training statistics for the model, including the precision, recall, and F-score for each class (label). FIG. 6A also indicates the number of user-entered pairs for each class for which relationships were identified in the corpus and the number of relationships identified for each class. FIG. 6B shows the t-distributed stochastic neighbor embedding (t-SNE) projection of the relational phrases in the pretrained vector space. This projection shows the principal features obtained from the model to visualize distances across clusters. Each cluster corresponds to a different relational phrase, and the size of the cluster indicates the number of times that relational phrase was identified (corresponding to the cluster weight). The distance between the clusters reflects the similarity of relational phrases. Solid circle clusters were classified as "indication" and open circle clusters were classified as "adverse event." When a user clicks on a cluster (indicated by the dashed outline), the relationship and cluster weight are displayed. Here, the user has selected "is approved for treatment," which has a cluster weight of 410 and was classified as "indication." Clicking on a cluster will also display the sentences and sources for the relational phrase. FIG. 6C shows the sentences for the relational phrase "is used to treat," which was classified as "indication." In this display, the drug terms are underlined with a solid line and the disease terms are underlined with a dashed line.

Figure 7:
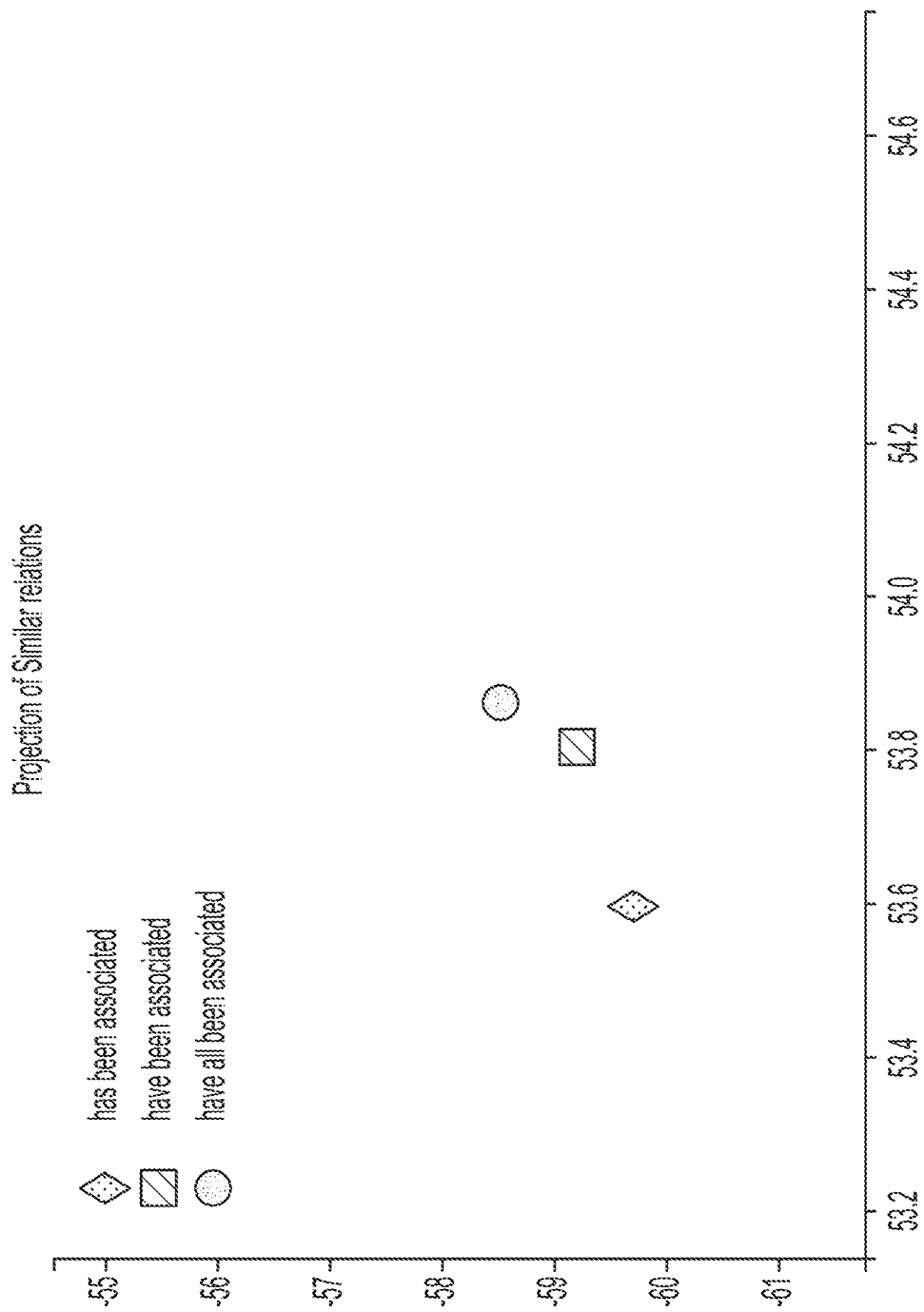
FIG. 7 shows a projection with three relational phrases determined to be similar, according to certain embodiments.

FIG. 7 shows a projection with three relational phrases determined to be similar. FIG. 7 shows these relational phrases in a two-dimensional projection. The relational phrases are "has been associated," "have been associated," and "have all been associated." This similarity was identified based on the cosine distance between these terms in the pretrained vector space, which is below a threshold. Here, the threshold distance was set to a cosine distance of 0.05 units in 1024-dimensional space. These three relational phrases are considered therefore to be the same relationship.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the communication protocol can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods for the communications protocol can also be embedded in a non-transitory computer-readable medium or computer program product, which includes all the features enabling the implementation of the methods described herein, and which, when loaded in a computer system is able to carry out these methods. Input to any part of the disclosed systems and methods is not limited to a text input interface. For example, they can work with any form of user input including text and speech.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this communications protocol can be embodied in other specific forms without departing from the spirit or essential attributes thereof, and accordingly, reference should be had to the following claims, rather than to the foregoing specification, as indicating the scope of the invention.

The communications protocol has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

It will be appreciated that while one or more particular materials or steps have been shown and described for purposes of explanation, the materials or steps may be varied in certain respects, or materials or steps may be combined, while still obtaining the desired outcome. Additionally, modifications to the disclosed embodiment and the invention as claimed are possible and within the scope of this disclosed invention.

The invention claimed is:

1. A method comprising
receiving, by a computing device, a first entity and a second entity;
accessing a corpus;
preprocessing, by the computing device, the corpus by:
grouping the corpus into a plurality of chunks at a head node;
distributing the plurality of chunks to a plurality of worker nodes configured as parallel processing units within a distributed cluster, wherein each worker node is executed on a separate physical or virtual machine and operates asynchronously;
retrieving a second plurality of sentences from one of the plurality of chunks of the corpus by one of the plurality of worker nodes;
extracting then sending a plurality of extracted entities and extracted relational phrases to the head node;
mapping the extracted relational phrases in a pretrained vector space using a pretrained
model to generate a plurality of extracted relational phrase embeddings;
clustering the extracted relational phrases in the pretrained vector space to generate clustering information for the plurality of extracted relational phrase embeddings; and
storing a mapping of the plurality of extracted entities, the plurality of extracted relational phrase embeddings, and the clustering information for the plurality of extracted relational phrase embeddings;
retrieving, by the computing device, a first plurality of sentences containing the first entity and the second entity from the corpus;
identifying, by the computing device, a plurality of relational phrases by extracting a relational phrase from each of the first plurality of sentences; and
identifying, by the computing device, one or more relationships between the first entity and the second entity.

2. The method of claim 1, wherein extracting the relational phrase from each of the first plurality of sentences comprises using a dependency parser to identify the relational phrase.

3. The method of claim 1, wherein extracting the relational phrase from each of the first plurality of sentences comprises using a constituency parser to identify the relational phrases.

4. The method of claim 1, further comprising
mapping each relational phrase in a pretrained vector space using a pretrained model; and
clustering the plurality of relational phrases in the pretrained vector space.

5. The method of claim 4, wherein the pretrained model is trained using a supervised model.

6. The method of claim 4, wherein the pretrained model is trained using a self- supervised model.

7. The method of claim 4, wherein clustering the plurality of relational phrases in the pretrained vector space comprises
setting a threshold cosine distance;
calculating a cosine distance between each of pair of the plurality of relational phrases in the pretrained vector space;
clustering the plurality of relational phrases such that each pair of relational phrases whose cosine distance is within the threshold cosine distance share a cluster.

8. The method of claim 4, wherein identifying one or more relationships between the first entity and the second entity is based on clustering the plurality of relational phrases in the pretrained vector space.

9. The method of claim 4, further comprising providing a robustness score for each of the one or more relationships based on clustering of the plurality of relational phrases.

10. The method of claim 9, wherein the robustness score is based on a cosine distance between the relational phrases in the pretrained vector space.

11. The method of claim 4, further comprising ranking the one or more relationships based on clustering of the plurality of relational phrases.

12. The method of claim 1, further comprising classifying the one or more relationships using a classification model.

13. The method of claim 12, further comprising training the classification model on the corpus using example labels, wherein each example label comprises an entity pair and a class.

14. The method of claim 13, wherein the example labels are generated by a human.

15. The method of claim 13, wherein the example labels are generated by a supervised model.

16. The method of claim 13, wherein training the classification model comprises receiving the example labels; and for each example label:
retrieving a plurality of training sentences containing the entity pairs from the corpus;
identifying a plurality of classification relational phrases by extracting a
relational phrase from each of the plurality of training sentences; and labeling the plurality of classification relational phrases with the class corresponding to the entity pair;
mapping the plurality of labeled classification relational phrases for each example label in the pretrained vector space using the pretrained model;
clustering the plurality of labeled classification relational phrases in the pretrained vector space.

17. The method of claim 12, wherein the classification model comprises a plurality of classification relational phrases identified during training.

18. The method of claim 17, further comprising mapping the plurality of relational phrases in the pretrained vector space;
clustering the relational phrases and the plurality of classification relational phrases in the pretrained vector space; and
assigning a label to each relational phrase based on the clustering of the plurality of relational phrases and the plurality of classification relational phrases in the pretrained vector space; and
assigning a classification to each of the one or more relationships between the first entity and the second entity.

19. The method of claim 18, wherein assigning the label to each relational phrase comprises
calculating a cosine distance between each relational phrase and each classification relational phrase in the pretrained vector space;
identifying a plurality of closest classification relational phrases for each relational phrase; and
assigning each relational phrase a label corresponding to that of the closest classification relational phrases.

20. The method of claim 18, further comprising assigning a confidence score to the classification.

21. The method of claim 20, wherein assigning the confidence score comprises calculating a cosine distance between each relational phrase and each classification relational phrase in the pretrained vector space;
identifying a plurality of closest classification relational phrases for each relational phrase; and
calculating an average cosine distance between each relational phrase and the closest classification relational phrases.

22. The method of claim 1, wherein the corpus comprises a preprocessed corpus comprising a mapping of a plurality of pre-extracted entities, a plurality of pre-extracted relational phrase embeddings, and clustering information for the plurality of pre-extracted relational phrase embeddings.

23. The method of claim 1, further comprising preprocessing the corpus by retrieving a second plurality of sentences from the corpus;
extracting a plurality of entities from each of the second plurality of sentences;
extracting a relational phrase for each pair of extracted entities;
mapping the extracted relational phrases in a pretrained vector space using a pretrained model to generate a plurality of extracted relational phrase embeddings;
clustering the extracted relational phrases in the pretrained vector space to generate clustering information for the plurality of extracted relational phrase embeddings; and
storing a mapping of the plurality of extracted entities, the plurality of extracted relational phrase embeddings, and the clustering information for the plurality of extracted relational phrase embeddings.

24. The method of claim 1, further comprising
accessing a preprocessed corpus, wherein the preprocessed corpus comprises a mapping of a plurality of pre-extracted entities, a plurality of pre-extracted relational phrase embeddings, and clustering information for the plurality of pre-extracted relational phrase embeddings;
retrieving the first plurality of sentences containing the first entity and the second entity from the corpus using the mapping of the plurality of pre-extracted entities; and
identifying the first plurality of relational phrases by using the pre-extracted relational phrase embeddings and the clustering information for the plurality of pre-extracted relational phrase embeddings for each of the first plurality of sentences.

25. The method of claim 1, further comprising
sending the first entity and the second entity to each of a plurality of worker nodes;
accessing a portion of a preprocessed corpus by one of the plurality of worker nodes, wherein the preprocessed corpus comprises a mapping of a plurality of pre-extracted entities, a plurality of pre-extracted relational phrase embeddings, and clustering information for the plurality of pre-extracted relational phrase embeddings;

retrieving the first plurality of sentences containing the first entity and the second entity from the corpus using the mapping of the plurality of pre-extracted entities by one of the plurality of worker nodes;

identifying the plurality of relational phrases by using the pre-extracted relational phrase embeddings and the clustering information for the plurality of pre-extracted relational phrase embeddings for each of the first plurality of sentences by one of the plurality of worker nodes;

sending the first plurality of sentences and the pre-extracted relational phrase embeddings and clustering information for the pre-extracted relational phrase embeddings for each of the first plurality of sentences to the head node by one of the plurality of worker nodes;

wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

26. The method of claim 24, further comprising classifying the one or more relationships using a classification model.

27. A system comprising:
a non-transitory memory; and
one or more hardware processors configured to read instructions from the non-transitory memory that, when executed cause one or more of the hardware processors to perform operations comprising:
receiving a first entity and a second entity;
accessing a corpus;
preprocessing the corpus by:
grouping the corpus into a plurality of chunks at a head node;
distributing the plurality of chunks to a plurality of worker nodes configured as parallel processing units within a distributed cluster, wherein each worker node is executed on a separate physical or virtual machine and operates asynchronously;
retrieving a second plurality of sentences from one of the plurality of chunks of the corpus by one of the plurality of worker nodes;
extracting then sending a plurality of extracted entities and extracted relational phrases to the head node;
mapping the extracted relational phrases in a pretrained vector space using a pretrained model to generate a plurality of extracted relational phrase embeddings;
clustering the extracted relational phrases in the pretrained vector space to generate clustering information for the plurality of extracted relational phrase embeddings; and
storing a mapping of the plurality of extracted entities, the plurality of extracted relational phrase embeddings, and the clustering information for the plurality of extracted relational phrase embeddings;
retrieving a first plurality of sentences containing the first entity and the second entity from the corpus;
identifying a plurality of relational phrases by extracting a relational phrase from each of the first plurality of sentences; and
identifying one or more relationships between the first entity and the second entity.

28. The system of claim 27, wherein extracting the relational phrase from each of the first plurality of sentences comprises using a dependency parser or a constituency parser to identify the relational phrase.

29. The system of claim 27, wherein the operations further comprise mapping each relational phrase in a pretrained vector space using a pretrained model; and
clustering the plurality of relational phrases in the pretrained vector space.

30. The system of claim 29, wherein the operations further comprise ranking the one or more relationships based on clustering of the plurality of relational phrases.

31. The system of claim 27, wherein the operations further comprise classifying the one or more relationships using a classification model; and
training the classification model on the corpus using example labels, wherein each example label comprises an entity pair and a class, wherein training the classification model comprises
receiving example labels; and for each example label:
retrieving a plurality of training sentences containing the entity pairs from the corpus;
identifying a plurality of classification relational phrases by extracting a relational phrase from each of the plurality of training sentences; and
labeling the plurality of classification relational phrases with the class corresponding to the entity pair;
mapping the plurality of labeled classification relational phrases for each example label in the pretrained vector space using the pretrained model;
clustering the plurality of labeled classification relational phrases in the pretrained vector space.

32. The system of claim 31, wherein the operations further comprise mapping the plurality of relational phrases in the pretrained vector space;
clustering the relational phrases and a plurality of classification relational phrases identified in training in the pretrained vector space; and
assigning a label to each relational phrase based on the clustering of the plurality of relational phrases and the plurality of classification relational phrases in the pretrained vector space; and
assigning a classification to each of the one or more relationships between the first entity and the second entity.

33. The system of claim 32, wherein the operations further comprise assigning a confidence score to the classification.

34. The system of claim 27, wherein the operations further comprise preprocessing the corpus by retrieving a second plurality of sentences from the corpus;
extracting a plurality of entities from each of the second plurality of sentences;
extracting a relational phrase for each pair of extracted entities;
mapping the extracted relational phrases in a pretrained vector space using a pretrained model to generate a plurality of extracted relational phrase embeddings;
clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

35. The system of claim 27, wherein the operations further comprise
accessing a preprocessed corpus, wherein the preprocessed corpus comprises a mapping of a plurality of pre-extracted entities, a plurality of pre-extracted relational phrase embeddings, and clustering information for the plurality of pre-extracted relational phrase embeddings;
retrieving the first plurality of sentences containing the first entity and the second entity from the corpus using the mapping of the plurality of pre-extracted entities; and
identifying the first plurality of relational phrases by using the pre-extracted relational phrase embeddings and the clustering information for the plurality of pre- extracted relational phrase embeddings for each of the first plurality of sentences.

36. The system of claim 28, wherein the operations further comprise sending the first entity and the second entity to each of a plurality of worker nodes;
accessing a portion of a preprocessed corpus by one of the plurality of worker nodes,
wherein the preprocessed corpus comprises a mapping of a plurality of pre-extracted entities, a
plurality of pre-extracted relational phrase embeddings, and clustering information for the plurality of pre-extracted relational phrase embeddings;
retrieving the first plurality of sentences containing the first entity and the second entity from the corpus using the mapping of the plurality of pre-extracted entities by one of the plurality of worker nodes;
identifying the plurality of relational phrases by using the pre-extracted relational phrase embeddings and the clustering information for the plurality of pre-extracted relational phrase embeddings for each of the first plurality of sentences by one of the plurality of worker nodes;
sending the first plurality of sentences and the pre-extracted relational phrase embeddings and clustering information for the pre-extracted relational phrase embeddings for each of the first plurality of sentences to the head node by one of the plurality of worker nodes;
wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

37. A non-transitory computer-readable medium storing instructions that, when executed by one or more hardware processors, cause the one or more hardware processors to perform operations comprising:
receiving a first entity and a second entity;
accessing a corpus;
preprocessing the corpus by:
grouping the corpus into a plurality of chunks at a head node;
distributing the plurality of chunks to a plurality of worker nodes configured as parallel processing units within a distributed cluster, wherein each worker node is executed on a separate physical or virtual machine and operates asynchronously;
retrieving a second plurality of sentences from one of the plurality of chunks of the corpus by one of the plurality of worker nodes;
extracting then sending a plurality of extracted entities and extracted relational phrases to the head node;
mapping the extracted relational phrases in a pretrained vector space using a pretrained
model to generate a plurality of extracted relational phrase embeddings;
clustering the extracted relational phrases in the pretrained vector space to generate clustering information for the plurality of extracted relational phrase embeddings; and
storing a mapping of the plurality of extracted entities, the plurality of extracted relational phrase embeddings, and the clustering information for the plurality of extracted relational phrase embeddings;
retrieving a first plurality of sentences containing the first entity and the second entity from the corpus;
identifying a plurality of relational phrases by extracting a relational phrase from each of the first plurality of sentences; and
identifying one or more relationships between the first entity and the second entity.

38. The non-transitory computer-readable medium of claim 37, wherein extracting the relational phrase from each of the first plurality of sentences comprises using a dependency parser or a constituency parser to identify the relational phrase.

39. The non-transitory computer-readable medium of claim 37, wherein the operations further comprise
mapping each relational phrase in a pretrained vector space using a pretrained model; and
clustering the plurality of relational phrases in the pretrained vector space.

40. The non-transitory computer-readable medium of claim 39, wherein the operations further comprise ranking the one or more relationships based on clustering of the plurality of relational phrases.

41. The non-transitory computer-readable medium of claim 37, wherein the operations further comprise
classifying the one or more relationships using a classification model; and training the classification model on the corpus using example labels, wherein each
example label comprises an entity pair and a class, wherein training the classification model comprises
receiving example labels; and for each example label:
retrieving a plurality of training sentences containing the entity pairs from the corpus;
identifying a plurality of classification relational phrases by extracting a
relational phrase from each of the plurality of training sentences; and labeling the plurality of classification relational phrases with the class corresponding to the entity pair;
mapping the plurality of labeled classification relational phrases for each example label in the pretrained vector space using the pretrained model;
clustering the plurality of labeled classification relational phrases in the pretrained vector space.

42. The non-transitory computer-readable medium of claim 41, wherein the operations further comprise
mapping the plurality of relational phrases in the pretrained vector space; clustering the
relational phrases and a plurality of classification relational phrases identified in training in the pretrained vector space; and assigning a label to each relational phrase based on the clustering of the plurality of relational phrases and the plurality of classification relational phrases in the pretrained vector space; and assigning a classification to each of the one or more relationships between the first entity and the second entity.

43. The non-transitory computer-readable medium of claim 42, wherein the operations further comprise assigning a confidence score to the classification.

44. The non-transitory computer-readable medium of claim 37, wherein the operations further comprise preprocessing the corpus by retrieving a second plurality of sentences from the corpus;

extracting a plurality of entities from each of the second plurality of sentences;

extracting a relational phrase for each pair of extracted entities;

mapping the extracted relational phrases in a pretrained vector space using a pretrained model to generate a plurality of extracted relational phrase embeddings;

clustering the extracted relational phrases in the pretrained vector space to generate clustering information for the plurality of extracted relational phrase embeddings; and storing a mapping of the plurality of extracted entities, the plurality of extracted relational phrase embeddings, and the clustering information for the plurality of extracted relational phrase embeddings.

45. The non-transitory computer-readable medium of claim 39, wherein the operations further comprise accessing a preprocessed corpus, wherein the preprocessed corpus comprises a mapping of a plurality of pre-extracted entities, a plurality of pre-extracted relational phrase embeddings, and clustering information for the plurality of pre-extracted relational phrase embeddings;

retrieving the first plurality of sentences containing the first entity and the second entity from the corpus using the mapping of the plurality of pre-extracted entities; and identifying the first plurality of relational phrases by using the pre-extracted relational phrase embeddings and the clustering information for the plurality of pre-extracted relational phrase embeddings for each of the first plurality of sentences.

46. The non-transitory computer-readable medium of claim 39, wherein the operations further comprise sending the first entity and the second entity to each of a plurality of worker nodes;

accessing a portion of a preprocessed corpus by one of the plurality of worker nodes, wherein the preprocessed corpus comprises a mapping of a plurality of pre-extracted entities, a plurality of pre-extracted relational phrase embeddings, and clustering information for the plurality of pre-extracted relational phrase embeddings;

retrieving the first plurality of sentences containing the first entity and the second entity from the corpus using the mapping of the plurality of pre-extracted entities by one of the plurality of worker nodes;

identifying the plurality of relational phrases by using the pre-extracted relational phrase embeddings and the clustering information for the plurality of pre-extracted relational phrase embeddings for each of the first plurality of sentences by one of the plurality of worker nodes;

sending the first plurality of sentences and the pre-extracted relational phrase embeddings and clustering information for the pre-extracted relational phrase embeddings for each of the first plurality of sentences to the head node by one of the plurality of worker nodes;

wherein the head node is configured to perform the operation of merging the first plurality of sentences and the pre-extracted relational phrase embeddings and clustering information for the pre-extracted relational phrase embeddings for each of the first plurality of sentences from each of the plurality of worker nodes to identify the one or more relationships.

47. The method of claim 1, wherein preprocessing the corpus further comprises:

executing, at each worker node, a model configured to extract a plurality of entities from each sentence of the second plurality of sentences by splitting the sentences into a list of entities while maintaining sentence boundaries using a sentence tokenizer, wherein the extracted entities are stored in an index mapping entities to sentences in which they occur;

executing, at each worker node, a model trained to extract a relational phrase for each pair of extracted entities by creating a constituency tree for each tokenized sentence, wherein the constituency tree is parsed to identify a hierarchy of phrases.

48. The system of claim 27, wherein preprocessing the corpus further comprises:

executing, at each worker node, a model configured to extract a plurality of entities from each sentence of the second plurality of sentences by splitting the sentences into a list of entities while maintaining sentence boundaries using a sentence tokenizer, wherein the extracted entities are stored in an index mapping entities to sentences in which they occur;

executing, at each worker node, a model trained to extract a relational phrase for each pair of extracted entities by creating a constituency tree for each tokenized sentence, wherein the constituency tree is parsed to identify a hierarchy of phrases.

49. The non-transitory computer-readable medium of claim 37, wherein preprocessing the corpus further comprises:

executing, at each worker node, a model configured to extract a plurality of entities from each sentence of the second plurality of sentences by splitting the sentences into a list of entities while maintaining sentence boundaries using a sentence tokenizer, wherein the extracted entities are stored in an index mapping entities to sentences in which they occur;

executing, at each worker node, a model trained to extract a relational phrase for each pair of extracted entities by creating a constituency tree for each tokenized sentence, wherein the constituency tree is parsed to identify a hierarchy of phrases.

* * * * *